(12) United States Patent
Black

(10) Patent No.: US 6,708,265 B1
(45) Date of Patent: Mar. 16, 2004

(54) METHOD AND APPARATUS FOR MOVING ACCESSES TO LOGICAL ENTITIES FROM ONE STORAGE ELEMENT TO ANOTHER STORAGE ELEMENT IN A COMPUTER STORAGE SYSTEM

(75) Inventor: David Black, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 221 days.

(21) Appl. No.: 09/605,378

(22) Filed: Jun. 27, 2000

(51) Int. Cl.$^7$ .......................... G06F 12/06; G06F 12/08; G06F 12/10
(52) U.S. Cl. ...................... 711/207; 711/202; 711/205; 711/206
(58) Field of Search ................................ 711/112, 113, 711/114, 202, 203, 204, 205, 206, 207

(56) References Cited

U.S. PATENT DOCUMENTS

| | | | |
|---|---|---|---|
| 5,129,088 A | | 7/1992 | Auslander et al. |
| 5,341,493 A | | 8/1994 | Yanai et al. |
| 5,369,758 A | | 11/1994 | Larson et al. |
| 5,537,568 A | | 7/1996 | Yanai et al. |
| 5,544,347 A | | 8/1996 | Yanai et al. |
| 5,546,557 A | | 8/1996 | Allen et al. |
| 5,778,391 A | | 7/1998 | Fisher et al. |
| 5,787,485 A | | 7/1998 | Fitzgerald, V et al. |
| 5,836,910 A | | 11/1998 | Duffy et al. |
| 5,870,732 A | | 2/1999 | Fisher et al. |
| 5,897,661 A | | 4/1999 | Baranovsky et al. |
| 5,918,229 A | | 6/1999 | Davis et al. |
| 5,956,750 A | * | 9/1999 | Yamamoto et al. ......... 711/112 |
| 5,963,971 A | | 10/1999 | Fosler et al. |
| 6,047,294 A | | 4/2000 | Deshayes et al. |
| 6,076,143 A | * | 6/2000 | Blumenau ................... 711/111 |
| 6,119,131 A | | 9/2000 | Cabrera et al. |
| 6,119,212 A | * | 9/2000 | Gross et al. ................ 707/200 |
| 6,161,111 A | | 12/2000 | Mutalik et al. |
| 6,185,601 B1 | | 2/2001 | Wolff |
| 6,189,071 B1 | | 2/2001 | Bachmat |
| 6,208,644 B1 | | 3/2001 | Pannell et al. |
| 6,216,211 B1 | | 4/2001 | McBrearty et al. |
| 6,240,511 B1 | | 5/2001 | Blumenau et al. |
| 6,256,705 B1 | * | 7/2001 | Li et al. ..................... 711/112 |
| 6,266,740 B1 | | 7/2001 | Don et al. |
| 6,304,942 B1 | | 10/2001 | DeKoning |
| 6,341,333 B1 | | 1/2002 | Schreiber et al. |
| 6,343,324 B1 | | 1/2002 | Hubis et al. |
| 6,405,284 B1 | | 6/2002 | Bridge |
| 6,405,294 B1 | | 6/2002 | Hayter |
| 6,421,684 B1 | | 7/2002 | Cabrera et al. |
| 6,446,176 B1 | | 9/2002 | West et al. |
| 6,493,729 B2 | | 12/2002 | Gusler et al. |
| 2002/0194294 A1 | | 12/2002 | Blumenau et al. |
| 2003/0130986 A1 | | 7/2003 | Tamer et al. |

FOREIGN PATENT DOCUMENTS

GB 2 297 636 A 8/1996

* cited by examiner

Primary Examiner—Mano Padmanabhan
Assistant Examiner—Midys Inoa
(74) Attorney, Agent, or Firm—Wolf, Greenfield & Sacks, P.C.

(57) ABSTRACT

Methods and apparatus are disclosed for moving logical entities from one storage element to another storage element. Movement of the logical entity may be accomplished by using a logical volume identifier, which is unique to the logical volume with respect to other logical volumes stored on the storage elements. The movement may be accomplished by changing an entry for the physical storage location corresponding to the unique logical volume identifier.

34 Claims, 25 Drawing Sheets

METHOD AND APPARATUS FOR MOVING ACCESSES TO LOGICAL ENTITIES FROM ONE STORAGE ELEMENT TO ANOTHER STORAGE ELEMENT IN A COMPUTER STORAGE SYSTEM

FIELD OF THE INVENTION

This invention relates to data storage for computers, and more particularly to methods and apparatus for moving accesses to logical entities from one storage element to another storage element in a computer storage system.

DISCUSSION OF THE RELATED ART

Virtually all computer applications (or programs) rely on storage. This storage can be used for both storing the computer code and for storing data manipulated by the code. (The term "data" refers to any information, including formatting information, error detection and correction information, executable code and data for manipulation by an application program.)

Storage technology has developed in a variety of different directions. Accordingly, a wide variety of storage systems are available. It has become impractical, therefore, for the person writing the computer application to also be responsible for detailed control over how data is stored on the storage system.

For this (and other) reasons, application programs typically run on an operating system (e.g., Unix, Windows, MS DOS, Linux, and the many variations of each). Once again, however, the operating system may be used with a variety of storage systems.

It would be highly inefficient to have to change the operating system, or the application programs, every time a change is made to physical storage. As a result, various layers of abstraction have evolved for viewing how data is actually stored in the storage system.

FIG. 1 illustrates one way of viewing the layers of abstraction. At the top level 10, the application program may assume that data is stored in a manner that has very little to do with how the data is placed onto the physical device. For example, the application may view the storage system as containing a number of directories and data files within the directories. Thus, in an application written for use in the Unix operating system, the application will assume that files are stored according to the Unix directory structure (including hierarchical directories and files located within the directories). This assumed organization of physical storage may have very little to do with how that data is actually stored onto the actual storage devices. This view may be referred to as the "logical view" because of the separation between the logical view of data from the application level is divorced from any view of how the data is physically stored. A logical entity, such as a file, database or other construct, may be referred to at the logical level as a "logical object."

The application level 10 interfaces with the file system level 12. The file system level is concerned with how files are stored on disks and how to make everything work efficiently and reliably. Thus, the file system level may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

Relatively early in the development of computer systems, disk drives became a fundamental device for storage. Accordingly, computer operating systems have been developed assuming that memory will rely on input/output ("I/O") to a disk drive. The file system 12, therefore, may assume one or more "volumes" which correspond to a physical storage unit such as a disk drive (or any other unit of storage), with data stored in blocks on the disk drive.

The demand for storage to be available for use by applications has sky rocketed. As a result, a number of separate physical devices may be required to accommodate the total amount of storage required for a system. In addition, storage systems are often changed or reconfirmed.

To insulate the operating system from any changes within the physical device storage system, some mechanism is often employed to flexibly map a standard (volume) view of physical storage onto an actual physical storage system. Thus, an operating system or application may rely on "volumes", of data. Again, these "volumes" may not correspond to how data is actually stored on physical devices. Accordingly, these are "logical volumes" (as opposed to actual physical storage volumes) and are themselves "logical objects."

The logical volume manager ("LVM") 14 of FIG. 1 can help achieve the function of mapping the file system view of data storage into an intermediate layer.

For purposes of the specification and claims, "logical volume" refers to a logical entity that generally corresponds to a logical abstraction of physical storage. "Logical volume" may include, for example, an entity that is treated (logically) as though it were composed of consecutively addressed blocks in a fixed block architecture or records in a count-key-data architecture. "Logical volume" includes not only standard logical volumes, but also components of a standard logical volume, hyper-volumes, partitions, striped volumes, and concatenated (or meta) volumes. A logical volume may be physically stored on more than one storage element.

Finally, the actual storage reading and writing (and, potentially, additional mapping onto physical storage devices) occurs within the physical storage system level 16, as illustrated in FIG. 1. Thus, for example, the logical volume manager may map the file system level view of data (as logical volumes or some other logical entity) into volume sizes corresponding to fixed physical storage segment sizes for storage on a physical device (e.g, block sizes). The physical storage system level may then map the logical volume manager level ("logical") volumes onto physical storage segments (e.g., hyper-volumes discussed below).

Logical volume managers have been implemented for use with the HP-UX by HP and by VERITAS for Solaris operating systems (i.e., VxVM), as examples. The Symmetrix line of storage systems, available from EMC Corporation, of Hopkinton, Mass., is one system capable of mapping hyper-volumes onto physical devices. (The Symmetrix product line of integrated cached disk arrays is described in numerous publications from EMC Corporation, including the Symmetrix model 55xx product manual, p-n200-810-550, rev.f, February, 1996.)

In the VERITAS Volume Manager, sold by VERITAS of Mountain View, Calif., logical volumes are assigned tags, which consist of an identifier for the host computer on which the volume manager is located and a time stamp indicating the time at which a logical volume was created. If a logical volume is electronically moved among the storage elements, it is assigned a new tag. Although logical volumes handled by this Volume Manager are not intended to be accessed by more than one host computer at any point in time, this has been done by manipulating the Volume Manager to provide tags for shared logical volumes to other host computers.

In any event, in the above examples, the mapping of application level data into actual physical storage occurs across four levels: application level to file system level; file system level to LVM level; LVM level to physical storage system level; and physical storage system level to the actual physical storage devices. More or fewer levels of mapping can be done. In some systems, for example, only one level of mapping is performed, e.g., mapping from the application level directly onto actual physical storage devices. In many systems, the mapping stage at the LVM level is omitted. Similarly, in many systems, no mapping is done at the physical storage level (e.g., data is stored directly onto actual devices corresponding to the format of the preceding level and without any further mapping onto physical storage components.) As another example, the file system level could be omitted and the application directly with logical (or actual) volumes.

FIG. 2A illustrates an example of the mapping that may be performed by the logical volume manager 14 and the physical storage system 16, to store data onto actual physical devices. The application/file system's view of the storage system contemplates three separate storage devices— volume A 20, volume B 21, and volume C 22. Thus, as far as the file system level 12 can discern, the system consists of three separate storage devices 20–22. Each separate storage device may be referred to as a "virtual volume," "logical volume" or "virtual disk." This reflects that the operating system's view of the storage device structure may not correspond to the actual physical storage system implementing the structure (hence, "virtual"). Unlike the application level 10, however, the file system 12 perspective is as if the file system 12 were dealing with raw physical devices or volumes.

As far as the file system level is concerned, the virtual volumes may be divided up into "partitions," which are continuous segments of storage. These partitions are, in fact, "virtual" partitions, because the partition may actually be stored across a variety of physical storage segments (e.g., hyper-volumes).

In FIG. 2A, the data is physically stored on the physical storage devices 24–26. In this particular example, although there are three physical devices 24–26 and three volumes 20–22, there is not a one to one mapping of the virtual volumes to physical devices. In this particular example, the data in volume A 20 is actually stored on physical devices 24–26, as indicated at 20a, 20b and 20c. In this example, volume B is stored entirely on physical device 24, as indicated at 22a, 22b. Finally, volume C is stored on physical device 24 and physical device 26 as indicated at 21a, 21b.

In this particular example, the boxes 20a–20c, 21a–21b and 22a–22b represent contiguous segments of storage within the respective physical devices 24–26. These contiguous segments of storage may, but need not, be of the same size. The segments of storage may be referred to as "hyper-volumes," and correspond to segments of physical storage that can be used as components when constructing a virtual volume for use by the file system. A hyper volume may be comprised of a number of "data blocks." A data block is a unit of storage (e.g., a 512 byte block) that is written or read at one time from the physical storage device.

Array management software running on a general purpose processor (or some other mechanism such as a custom hardware circuit) 23 translates requests from a host computer (not shown) (made assuming the logical volume structure 20–22) into requests that correspond to the way in which the data is actually stored on the physical devices 24–26. In practice, the array management software 23 may be implemented as a part of a unitary storage system that includes the physical devices 24–26, may be implemented on a host computer, or may be done in some other manner.

In FIG. 2A the array management software 23 performs the functions of both the logical volume manager 14 (if present) and the physical storage level 16, by mapping the file system's virtual volumes 20–22 into segments that can be stored onto physical devices 24–26. The array management software 23 also performs the functions of the physical storage system level 16, by determining where to store the hyper-volumes 20a–20c, 21a–21b and 22a–22b.

The physical storage devices shown in the example of FIG. 2A are disk drives. A disk drive may include one or more disks of a recording media (such as a magnetic recording medium or an optical recording medium). Information can be written and read from this storage medium for storage purposes. The recording medium is typically in the form of a disk that rotates. The disk generally includes a number of tracks on which the information is recorded and from which the information is read. Each track may include more than one "data block." A data block is a unit of data that can be read as a single unit. A data block may be a 512 byte block of data, an 8k segment on a 32k track, or some other structure. In these examples, the size of the block is fixed. In other cases, the block may be of variable size, such as a CKD record. In a disk drive that includes multiple disks, the disks by convention are described as though they are stacked so that corresponding tracks of each disk overlie each other. In this case, specification of a single track on which information is stored within the disk drive includes not only specification of an individual track on a disk, but also which of the multiple disks the information is stored on.

To identify an individual data block, an address may include a specification of the disk (which may consist of several "platters") a specification of the track within the disk (or "cylinder"), a specification of the head (or which of the platters comprising the "disk") and a specification of the particular data block within the track. The specification of the position of the data block within the track may, for example, be addressed as an offset, e.g., this is the third data block appearing on the track. Thus, an address of ddc-ccch:offset may specify a block—disk dd, cylinder cccc, head h and the specified offset. The physical storage devices for use with the present invention may, however, be formed in any other geometry, addressed in any other manner or even constitute a different type of storage mechanism.

FIG. 2B illustrates one example of mapping between the top level of abstraction—the application level—to the actual physical storage level. An application level file 200 includes visual information. This information is in the form of a conventional file and includes a series of bits.

When the application level file is mapped onto physical storage, the application level file may be converted into segments of the individual bits, e.g., segment 203. Thus, a segment of the application level file 203 is mapped (for example according to the general mapping structure described above with reference to FIG. 1) onto actual physical storage devices 204–206. In this example, the first segment of bits in 203 in the application level file 200 is mapped onto physical storage device 204, at a portion 208 of the physical storage device 204.

As shown in FIG. 2B, the individual segments of bits in the application level file 200 may be mapped anywhere among a plurality of actual physical storage devices. The granularity of the segments of bits (e.g., segment 203) may correspond to one of a variety of different levels. For example, the granularity of the segments may be a 512 byte data block. In another embodiment, the granularity may correspond to the amount of data stored in a track of the physical storage devices 204–206 (when the physical storage devices are disk drives).

FIG. 2C illustrates an example of a logical object 27 that includes six data blocks or logical block elements 27a–27f. The logical object itself may be any data structure or collection of data. For example, the logical object could be a database table, a portion of a file system file, or a complete file system file, a logical volume or any other identifiable logical object. Each of the data blocks 27a–27f may be a fixed size data block, or a varying size data block such as a CKD record.

In the example of FIG. 2C, the logical object is stored on a physical storage device 28. In this example, the storage device includes a number of columns, each representing a track of a disk.

Each row of the physical storage device represents a physical data or block element within the applicable column/track. For example, row 28a, column 28b, stores a data block corresponding to the logical block element 27b. Track 28b would store physical data blocks that have the contents of logical block elements 27a and 27b. As can be seen from FIG. 2C, the logical block elements can be stored in any order on the physical devices.

While the physical storage device 28 is illustrated as a contiguous array, this need not be the case. For example, each of the tracks, such as column 28b, may be stored on a different disk drive or be part of a different hyper volume.

In a system including an array of physical disk devices, such as disk devices 24–26 of FIG. 2A, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed., February, 1996). These systems include "RAID" storage systems. RAID stands for Redundant Array of Independent Disks.

FIG. 3A illustrates one technique for storing redundant information in a RAID system.

Under this technique, a plurality of physical devices 31–33 include identical copies of the data. Thus, the data MI can be "mirrored" onto a portion 31 of physical device 31, a portion 32a of physical device 32 and a portion 33a of physical device 33. In this case, the aggregate portions of the physical disks that store the duplicated data 31a, 32a and 33a may be referred to as a "mirror group." The number of places in which the data M1 is mirrored is generally selected depending on the desired level of security against irrecoverable loss of data.

In a mirror group, the copies are "linked." That is, any update to one mirror causes an update to each other mirror in the group.

FIG. 3A shows three physical devices 31–33 which appear to be located in close proximity, for example within a single storage system unit. For very sensitive data, however, one or more of the physical devices that hold the mirrored data may be located at a remote facility. "RAID 1" is an example of data redundancy through mirroring of data. In a RAID 1 architecture, a number of different mechanisms may be used for determining how to access and update data to improve, for example, performance of the storage system. In any event, a RAID 1 architecture certainly has the ability to recover lost data. Unfortunately, the RAID 1 architecture multiplies the cost of physical storage by the number of "mirrors" included in the mirror group.

FIG. 3B illustrates a solution that requires less added storage. In FIG. 3B, data is stored at locations 34a–34d. In this particular example, the physical device 33 includes parity information P1 at 35a, 35b. The parity information is generated by a simple exclusive-OR ("XOR") of the corresponding bits of data. Thus, the parity information P1 would be generated by XORing the corresponding bits of the data D1 and data D2.

A variety of mechanisms are known for distributing the parity information on the physical devices. In the example shown in FIG. 3B, all of the parity information is stored on a single physical device 33. In other cases, the parity information may be distributed across the physical devices.

FIG. 4 illustrates the concept that, within a given disk array, there is no need for all of the data to follow the same redundancy rule. In FIG. 4, a first group of storage segments on physical devices 40–42 form a mirror group 44. In the mirror group 44, the entire contents of a single logical volume (HV-A) are mirrored on three different physical devices 40–42.

In FIG. 4, a single virtual volume is stored on the fourth physical device 43, without any redundancy information, as indicated at 46.

Finally, a last group of data segments 45, on all four physical devices 40–43, implement a parity redundancy scheme. In this particular example, the parity information is stored in segments of memory on two different physical devices 42–43, as indicated at 47a and 47b.

The storage system of FIG. 4 contains redundant information that permits recovery from errors, including use of a mirror for data located at a remote facility, that also permits recoveries from catastrophic failure.

FIG. 5 illustrates one system for additional backup, which may be used or adapted in accordance with certain aspects of the present invention. In FIG. 5, a computer or client 50 performs its operations using storage system 52. The client 50 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system. The storage system 52 may be any conventional storage system, including a Symmetrix storage system, described above. The client 50 may be connected to many other devices over a network 56.

A backup storage system 54 is also attached to the network 56. The backup storage system 54 includes a backup storage device (which may be disk drives, tape storage or any other storage mechanism), together with a system for placing data into the storage and recovering the data from that storage.

To perform a backup, the client 50 copies data from the storage system 52 across the network 56 to the backup storage system 54. This process can be explained in greater detail with reference to FIG. 1. The storage system 52 may correspond to the actual physical storage 16 of FIG. 1. For the client 50 to write the backup data over the network 56 to the backup storage system 54, the client 50 first converts the backup data into file data—i.e. gets the data from the physical storage system level 16, and converts the data into application level format (e.g. a file) through the logical volume manager level 14, the file system level 12 and the application level 10. Thus, an actual data file may be communicated over the network 56 to the backup storage device 54. When the backup storage device 54 receives the data file, the backup storage system 54 can take the application level 10 data file, convert it to its appropriate file system level 12 format for the backup storage system, which can then be converted through a logical volume manager 14 level and into physical storage 16.

This form of backing up data may be referred to as "logical-logical" backup. That is, the logical data is backed up on the backup storage device 54. The data to be backed up is presented independent of the manner in which it is physically stored on storage system 52 at the physical storage system level 16, independent of the file system level mechanisms on the client 50, and independent of how data is stored on the backup storage device 54.

The EDM (EMC Data Manager) line of products is capable of logical-logical backup over a network, as described in numerous publications available from EMC, including the EDM User Guide (Network) "Basic EDM Manual".

FIG. 6 illustrates one embodiment of an alternative structure for backup of data which may also be used in accordance with the present invention. In the embodiment of FIG. 6, a direct connection 60 is established between the storage system 52 and the backup storage system 54. In this embodiment, the backup storage system may be a system as generally described in EMC Data Manager: Symmetrix Connect User Guide, P/N 200-113-591, Rev. C, December 1997, available from EMC Corporation of Hopkinton, Mass. The direct connection 60 may be a high speed data channel, such as a SCSI cable or one or more fibre-channel cables. In this system, a user may be permitted to backup data over the network 56, or the direct connection 60.

Whether the restore and backup process is done at a logical level or at a physical level, backups in the prior art require copying a complete file (or in some instances even more, such as an entire partition) for the backup. Methods of backing up and restoring data on the system of FIG. 6 are described in co-pending and commonly owned U.S. pat. application Ser. No. 09/052,579, entitled "Logical Restore From A Physical Backup In A Computer Storage System," filed Mar. 31, 1998, and naming John Deshayes and Madhav Mutalik as inventors, and which is hereby incorporated herein by reference in its entirety.

FIG. 7 shows a storage system 70 that may be used as the storage system 52 of FIG. 6. The client 50 may be connected to the storage device using a channel or bus 71. The channel for communication with the client 50 can be any suitable connection such as fibre channel, Small Computer System Interface ("SCSI") or Enterprise Systems Connection Architecture ("ESCON"). While only one communication channel 71 into the storage system 70 is shown in FIG. 7, other channels may be included. (While the method and apparatus of the present invention may be described with reference to the storage system of FIG. 6 and the physical storage system (and associated features and methods) of FIG. 7, this is not intended to be limiting. The present invention has broader application. Certain aspects of the invention may be applied to any storage system.)

Within the storage system 70 is a host adapter 72. In this particular embodiment, the host adapter 72 is responsible for managing and translating read and write requests from the ost computer (e.g., client 52 or backup storage system 54), which are based on the virtual disk structure (e.g., from the file system or logical volume manager level), into one or more requests corresponding to how data is stored on the actual physical storage devices 76a–76d of the storage system 70. Thus, in this embodiment, the host adapter 72 implements at least some of the array management software 23 functions of FIG. 2. The host adapter 72 can be implemented in any of a number of ways, including using a general purpose processor or a custom hardware implementation. In addition, multiple host adapters may be included to facilitate having additional I/O channels for the storage system 70.

The host adapter 72 communicates with the other components of the storage system 70 using an interconnect such as bus 73. The bus 73 may be any suitable communication element, including use of SCSI, ESCON, and other bus protocols.

Access to the physical storage devices 76a–76d is controlled through the use of disk adapters 75a–75d. The disk adapter 75a–75d can also be implemented using a general purpose processor or custom hardware design. In the embodiment illustrated in FIG. 7, a disk adapter is provided for each physical storage device. A disk adapter can, of course, have more than one storage device attached to it. In addition, disk adapters may include secondary connections to the physical storage devices of another disk adapter. This permits recovery from failure of one disk adapter by shifting its functions to the second disk adapter.

In the embodiment of FIG. 7, reading and writing to the physical storage device 76a–76d through the disk adapters 75a–75d is facilitated through use of a cache 74. The cache 74 may be a random access memory having greater speed than the disk drives. When reading data, if the data is being temporarily stored in the cache, the read request can be fulfilled more quickly by taking the data from the cache 74. Similarly, when writing data, the data to be written can be stored in the cache. The other components of the system can proceed, while the data is written from the cache to the applicable physical storage device.

Any of a variety of mechanisms can be used to implement and manage the cache. An example of such a mechanism is included in U.S. Pat. No, 5,537,568, entitled "System for dynamically controlling cache manager maintaining cache index and controlling sequential data access," issued on Jul. 16, 1996. Similarly, writes may be accomplished through the cache using any of a variety of mechanisms and strategies. One mechanism for writing from the cache is to store the data to be written in the cache, and mark a "write pending" bit. When the write pending bit is encountered, the applicable data can be written to the disk. This technique is described generally in U.S. Pat. No. 5,341,493, entitled "Disk storage system with write preservation during power failure," issued on Aug. 23, 1994.

The cache may be divided into more than one area. For example, the cache may include an area 74a for storing data being read or written from physical storage devices 76a–76d. The cache may further include a "mailbox" area 74b. The mailbox area 74b may be used to facilitate communications among the disk adapters 75a–75d and with the host adapter 72. For example, each disk adapter may have its own area within the mailbox 74b. Each of the disk adapters 75a–75d can post or read information from the applicable mailbox area 74b, to communicate status and other information.

A remote adapter 78 may also be attached to the bus 73 of the storage system 70. The remote adapter may be employed for communication with remote data facilities ("RDF"), for example, connection to another storage device to maintain a mirror redundancy group. One form of RDF link and method of implementation is described in various publications available from EMC Corporation, including SYMMETRIX Remote Data Facility Product Manual, P/N 200-999-554, rev. B, June 1995. RDF embodiments are also described in U.S. Pat. No. 5,544,347 (Yanai) which is hereby incorporated herein by reference in its entirety. It should be appreciated, however, that the present invention is not limited to the use of RDF or to a system that employs SYMMETRIX disk arrays, and can be employed with any of numerous other types of storage systems.

A service processor 77 may be coupled to the bus 73 of the storage system 70. The service processor 77 may include a display, keyboard and other I/O devices to permit an operator to use the service processor 77 for configuring the components of the storage system 70 and for running or initiating diagnosis and maintenance facilities.

While the method and apparatus of the present invention may be described with reference to the systems and concepts described above and in the discussion of the related art, this is not intended to be limiting. The present invention has broader application. Certain aspects of the invention may be applied to any storage system. Accordingly, the invention is only limited by the claims set forth below.

SUMMARY OF THE INVENTION

According to one embodiment of the present invention, a method of specifying a logical volume in the computer system is disclosed. The computer system may have a plurality of storage elements and a plurality of host computers. According to this embodiment, the method comprises steps of assigning a logical volume identifier to the logical volume and assuring that the logical volume identifier is unique to the logical volume. According to this (and certain other) embodiments, the logical volume may be a conventional logical volume, a partition, a hyper-volume, a striped volume or a component of a conventional logical volume. As defined more fully below, a "logical volume" is an entity that a host or application level computer use as a unit of storage. According to this embodiment, the same logical volume identifier may be maintained when a logical volume is moved among storage elements in the computer system. The logical volume identifier may be assigned independent of the location of storage for the logical volume. Descriptive information may be maintained with respect to logical volumes and their associated logical volume identifier, such as identifying the entity that created the logical volume, identifying entities that may access the logical volume, identifying access history for the logical volume and other information. The format of the logical volume identifier may correspond to the format for memory access requests made by host computers in the system. For example, the format may be that of a world wide name or a world wide name with a logical unit identifier or may correspond to these formats by including these as a subfield. The logical volume identifier may be assigned independent of the host computer that created the logical volume.

According to another embodiment of the present invention, a method of storing and maintaining a logical volume is disclosed. According to this embodiment, the logical volume is identified and then an ELVID (as defined below) is assigned to the logical volume. The same ELVID is maintained when the logical volume is electronically moved. A database of ELVIDs may be maintained at a storage management console or elsewhere.

According to another embodiment of the present invention, a computer system is disclosed. According to this embodiment, a plurality of storage elements are provided together with means for assigning a logical volume identifier to a logical volume and means for assuring that the logical volume identifier is unique to the logical volume to which it is assigned.

According to another embodiment of the present invention, a computer storage system is disclosed. According to this embodiment, at least one storage element is provided, together with means for assigning ELVIDs to logical volumes stored on the storage element. Such means may be provided at a storage management controller, on one or more of the storage elements or elsewhere.

According to another embodiment of the present invention, a storage management controller is disclosed. According to this embodiment, an ELVID assignor is provided to assign ELVIDs to logical volumes. According to this embodiment, an interface is also provided for communication with storage elements. The storage management controller may further include an ELVID database manager or a logical volume movement manager.

According to another embodiment of the present invention, a storage management controller is provided. According to this embodiment, the storage management controller includes an ELVID database manager and a memory to store an ELVID database.

According to another embodiment of the present invention, a method of inventorying logical volumes in a computer storage system is disclosed. According to this embodiment, identifying information for each user of a respective logical volume is maintained for each of a plurality of logical volumes in the computer storage system. "Users" may be any definable entity permitted to access memory, such as a host computer, an account on one or more host computers (e.g., a person logged into a computer on their account) or an application program. For each of the plurality of logical volumes, a verification step is performed to assure that logical volume is still in use. For example, if a logical volume has not been accessed for a great period of time, the logical volume may not need to be maintained on a primary storage element and can be moved to secondary storage. The step of verifying that the logical volume is still in use can be performed as a continuous discrete process for the computer storage system, for logical volumes on a specific storage element or in some other fashion.

According to another embodiment of the present invention, a storage element is disclosed. According to this embodiment, the storage element includes a storage medium, an access manager module to maintain identifying information for each user of logical volumes and a verifier module to perform verification. A verification module may include a time tracker to identify when a logical volume has not been accessed for an identified period of time.

According to another embodiment of the present invention, a storage management controller is disclosed.

According to this embodiment, an access manager module and a verifier module are included.

According to another embodiment of the present invention, a method of detecting when one of a plurality of logical volumes no longer needs to be stored on a respective storage element. According to this embodiment, accesses to the logical volumes are tracked, a logical volume that has not been accessed for a predetermined period of time is automatically identified and, for such an identified logic volume, it is determined whether the identified logical volume still requires storage on its present storage element. This step of determining may comprise a step of polling users which have accessed the identified logical volume in the past.

According to another embodiment of the present invention, a method of identifying a logical volume is provided. According to this embodiment, the logical volume is identified by reading an ELVID assigned to the logical volume and using the ELVID to access identifying information about the logical volume. According to this embodiment, a database may be maintained, for example, at a storage management controller, The identifying information may identify host computers that created the logical volume or host computers authorized to access the logical volurnesor host computers that have accessed the logical volume (or which currently have an open session which permits access of the logical volume).

According to another embodiment of the present invention, a computer system is disclosed. According to this embodiment, a plurality of storage elements are provided together with means for reading a logical volume identifier and means for using the logical volume identifier to access identifying information about the logical volume.

According to another embodiment of the present invention, a logical volume identifier. data basic is disclosed. According to this embodiment, a computer readable media provided which stores a plurality of logical—volume identifiers, each identifier being unique to a respective logical volume stored among a plurality of storage elements. As above, additional identifying information may be included in the database.

According to another embodiment of the present invention, a method of providing a user with access to a logical volume is disclosed. According to this embodiment, an ELVID for the logical volume is determined and provided to the user. The user may be a host computer or an individual account on a host computer. The term "host computer" as used in this specification and claims includes both host computer sites, user accounts on host computer sites and other entities that are permitted user level access to data stored on storage elements in the computer system. According to this embodiment, the method of providing access can include a step of maintaining a database of ELVIDs stored on a plurality of storage elements. The maintaining step may be performed on a host computer or a storage management controller.

According to another embodiment of the present invention, a method of accessing logical volumes is disclosed. According to this embodiment, an ELVID is determined and used to access the logical volume.

According to another embodiment of the present invention, a host computer is disclosed. According to this embodiment, the host computer includes a processing unit (any hardware unit which permits processing, such as a microcontroller, microprocessor, or special hardware designed for a particular host computer) and an ELVID interface module to translate requests for accesses to a logical volume to an ELVID for the logical volume.

According to another embodiment of the present invention, a host computer is disclosed. According to this embodiment, the host computer includes a processing unit and an ELVID module to translate an ELVID for a logical volume to a physical storage location for that logical volume.

According to another embodiment of the present invention, a storage management controller is disclosed. According to this embodiment, the storage management controller includes an access management module to provide access to logical elements by providing a physical storage address associated with an ELVID for the respective logical volume.

According to another embodiment of the present invention, a computer system is disclosed. According to this embodiment, the computer system includes a plurality of host computers, a plurality of storage elements and means for assigning ELVIDs to logical volumes.

According to another embodiment of the present invention, a method of moving a logical entity from a first storage element to a second storage element is disclosed. According to this embodiment, a copy of the logical entity is created on the second storage element (for example, by mirroring). All reads for the logical entity are moved to the location of the second storage element. After all of the reads have been moved writes are moved to the location for the logical entity on the second storage element. If a mirror is used, the mirror may be maintained while all of the reads are moved. The logical entity may be a logical volume, such as a conventional logical volume, a component of a conventional logical volume, a hyper volume, a partition or a striped volume. The method according to this embodiment may include a step of determining an ELVID for the logical entity.

According to another embodiment of the present invention, a host computer is disclosed. According to this embodiment, the host computer includes a processing unit and a memory interface module. According to this embodiment, the memory interface module permits access to a logical entity to be made to one physical storage location for read request while write requests are made to a different physical storage location. According to some embodiments, the memory interface module can include an ELVID interface module to translate requests for access to a logical volume to an ELVID for that logical volume. According to other embodiments, the memory interface module may instead or in addition include an ELVID interface module to translate an ELVID to a physical storage location for a logical volume.

According to another embodiment of the present invention, a storage management controller is disclosed. According to this embodiment, the storage management controller includes an interface module to communicate with storage elements and an entity movement manager to control separate moving of read locations and write locations for a specified logical entity.

According to another embodiment of the present invention, a computer system is disclosed. According to this embodiment, the computer system includes a plurality of host computers, a plurality of storage elements and means for separately moving reads for a logical entity and writes for a logical entity.

According to another embodiment of the present invention, a method of moving a logical volume from a first storage element to a second storage element is disclosed. According to this embodiment, an ELVID is provided for the logical volume. A copy of the logical volume is provided on the second storage element. The physical storage location on the second storage element is associated with the ELVID to cause accesses to the logical volume to be made to the second storage element. The step of associating may be performed, for example, by the host computer, a storage management controller or both (for example, with the storage management controller initiating the change in the host computer performing the change).

According to another embodiment of the present invention, a method of rolling back a logical volume to a previous state is disclosed. According to this embodiment, a copy of the logical volume in a previous state is provided. An ELVID for the logical volume is provided. The roll back is completed by associating a physical storage location for the copy with the ELVID, to cause accesses to the logical volume to be made to the physical storage location for the copy.

According to another embodiment of the present invention, a method of providing for and implementing immediate restoration of the logical volume is disclosed. According to this embodiment, a restoration copy of the logical volume is maintained at a physical storage location on a storage device. An ELVID is provided for the logical volume. The restoration is completed by changing a physical storage location associated with the ELVID for the logical volume to correspond to the physical location on the storage device for the restoration.

According to another embodiment of the present invention, a storage management controller for a storage system with a plurality of storage elements is disclosed. According to this embodiment, the storage management controller includes an interface module to communicate with the storage elements and a logical volume movement module to move the location of logical volume access request by updating entries in at least one ELVID database.

According to another embodiment of the present invention, a computer system is disclosed. According to this embodiment, at least one host computer and a plurality of storage devices are included in the computer system. The computer system further includes means for changing the location of access requests, including means for changing a physical storage location address associated with an ELVID for the logical volume.

Accordingly to another embodiment of the present invention, a method of accessing a logical volume stored on at least one of the plurality of storage elements is disclosed. According to this embodiment, an ELVID for the logical volume is specified. A physical storage address for the logical volume is also specified. This embodiment further includes a step of verifying that the ELVID corresponds to the physical storage address. The verification step may be performed, for example, by a host computer, a storage management controller, a storage element or some combination of these.

According to another embodiment of the present invention, a method of accessing a logical volume stored on at least one of a plurality of storage elements is disclosed. According to this embodiment an ELVID for the logical volume is specified and a physical storage address for the logical volume is specified. The method includes a step of using the ELVID to assure that an entity requesting access to the logical volume is authorized to do so.

According to another embodiment of the present invention, a host computer is disclosed. According to this embodiment, the host computer includes a processing unit and an ELVID interface module to transmit access requests for logical volumes, access requests including an ELVID for the logical volume and a respective physical storage location for the logical volume.

According to another embodiment of the present invention, a storage device is disclosed. According to this embodiment, the storage device includes a storage medium and an ELVID verifier module, to verify access requests.

According to another embodiment of the present invention, a storage device is disclosed. According to this embodiment, the storage device includes a storage medium and an ELVID authorization module to verify access requests.

According to another embodiment of the present invention, a computer system is disclosed. According to this embodiment, the computer system includes at least one host computer, a plurality of storage elements, means for associating ELVIDs with requests for access to logical volumes and means for verifying that access requests to physical storage locations are made for the appropriate logical volume identified by a respective ELVID.

According to another embodiment of the invention, a computer system is disclosed. According to this embodiment, the computer system includes at least one host computer, a plurality of storage elements and means for verifying that access request logical volumes having an associated ELVID are made by an entity authorized access logical volume.

Each of the above disclosed invention embodiments may be used and applied separately and independently, or may be applied in combination. Description of one aspect of the invention is not intended to be limiting with respect to other aspects of the invention. In addition, application of combinations of the above disclosed embodiments may also be inventive; systems including many of these combinations is described more fully below.

DETAILED DESCRIPTION

Storage as a Domain.

Figure 1:
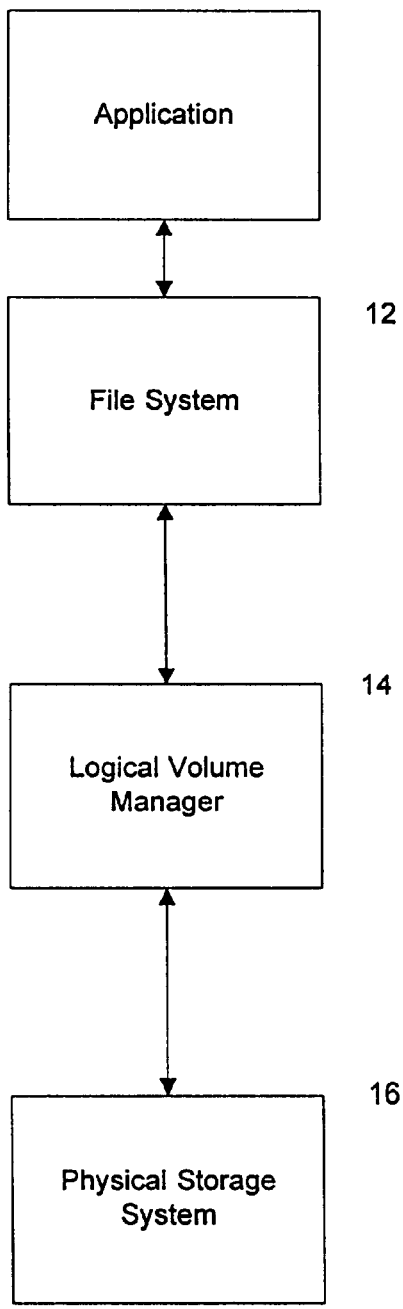
FIG. 1 illustrates an example of conversion of application level data to storage in a physical system and vice versa.
Figure 2A:
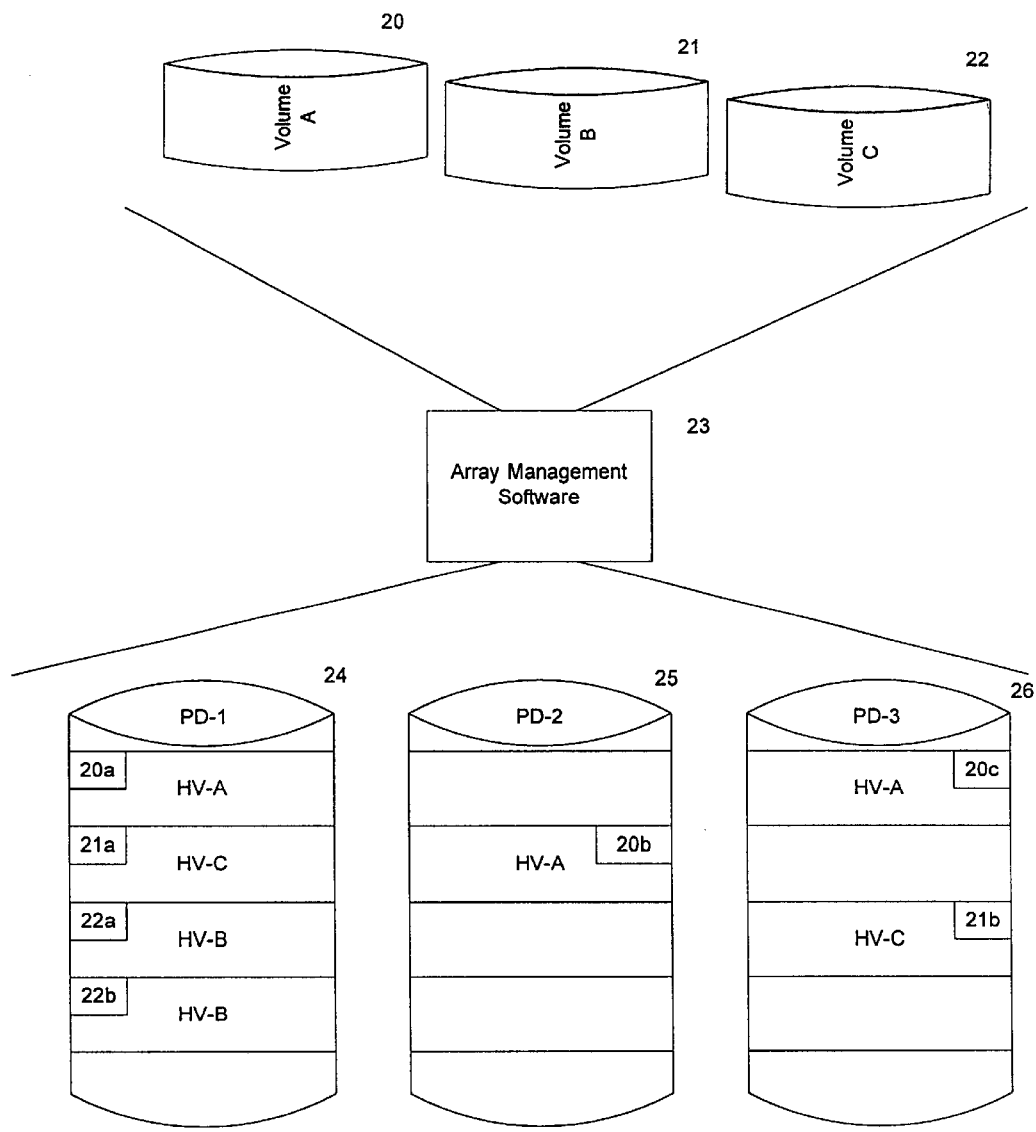
FIG. 2A illustrates an example of the relationship between logical volumes and physical storage devices.
Figure 2B:
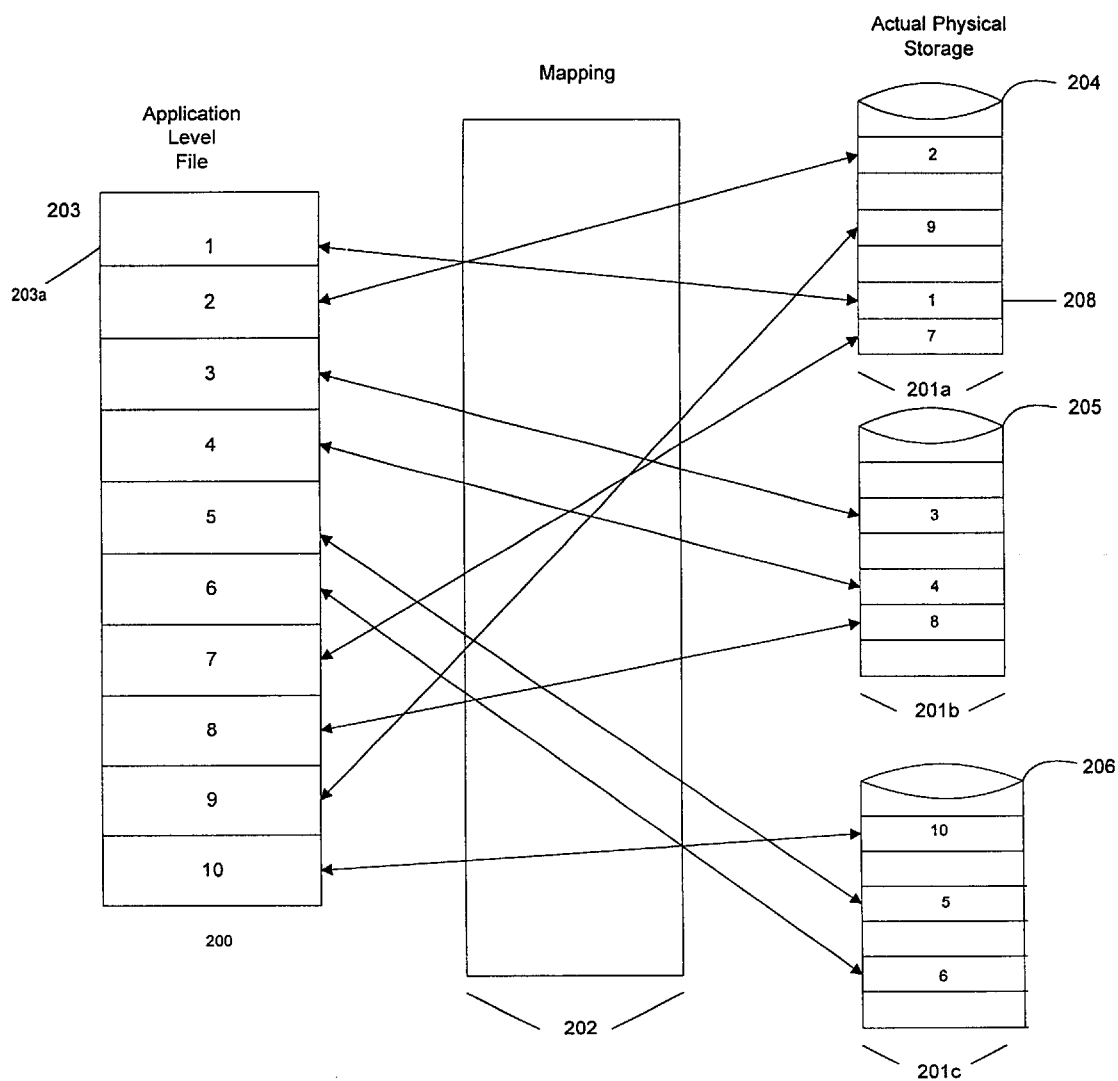
FIG. 2B illustrates an example of mapping a logical file onto a physical storage system.
Figure 2C:
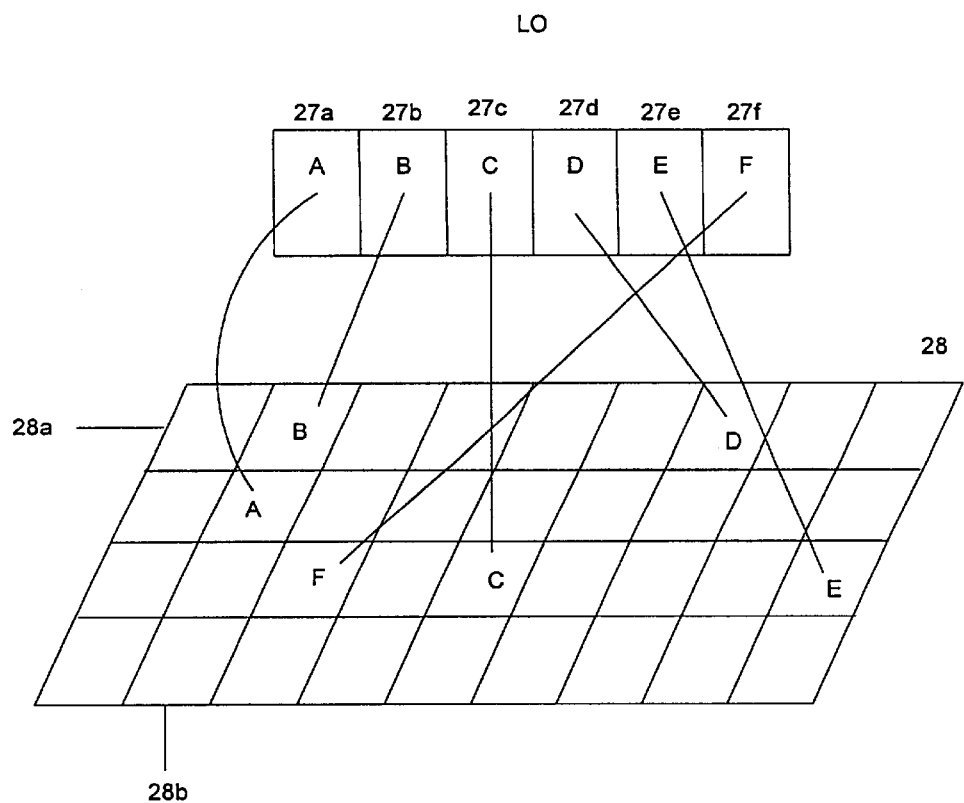
FIG. 2C illustrates another example of mapping a logical object onto a physical storage device.
Figure 3A:
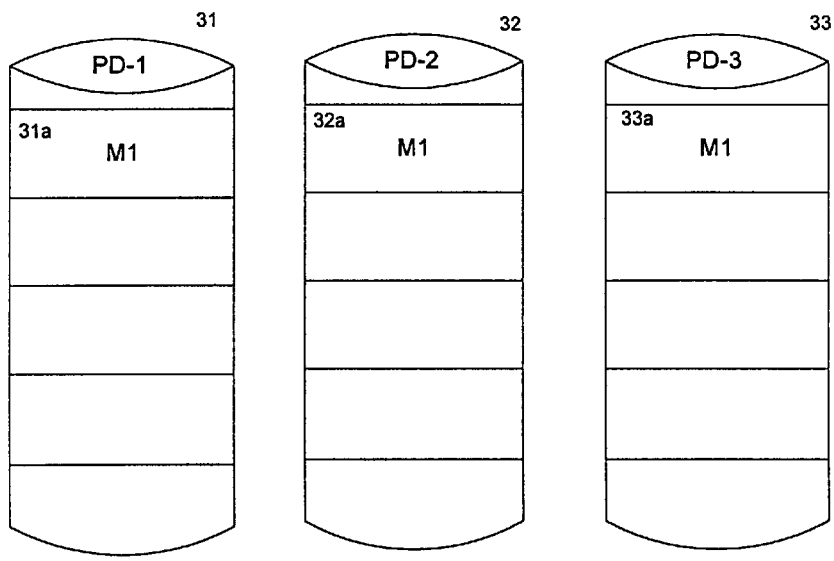
FIG. 3A illustrates an example of mirroring on different physical storage devices.
Figure 3B:
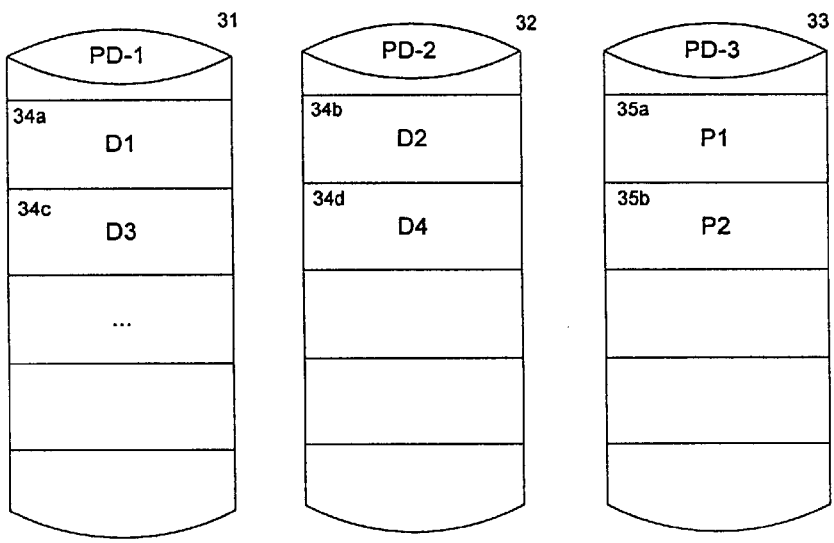
FIG. 3B illustrates an example of redundant parity information on physical storage devices.
Figure 4:
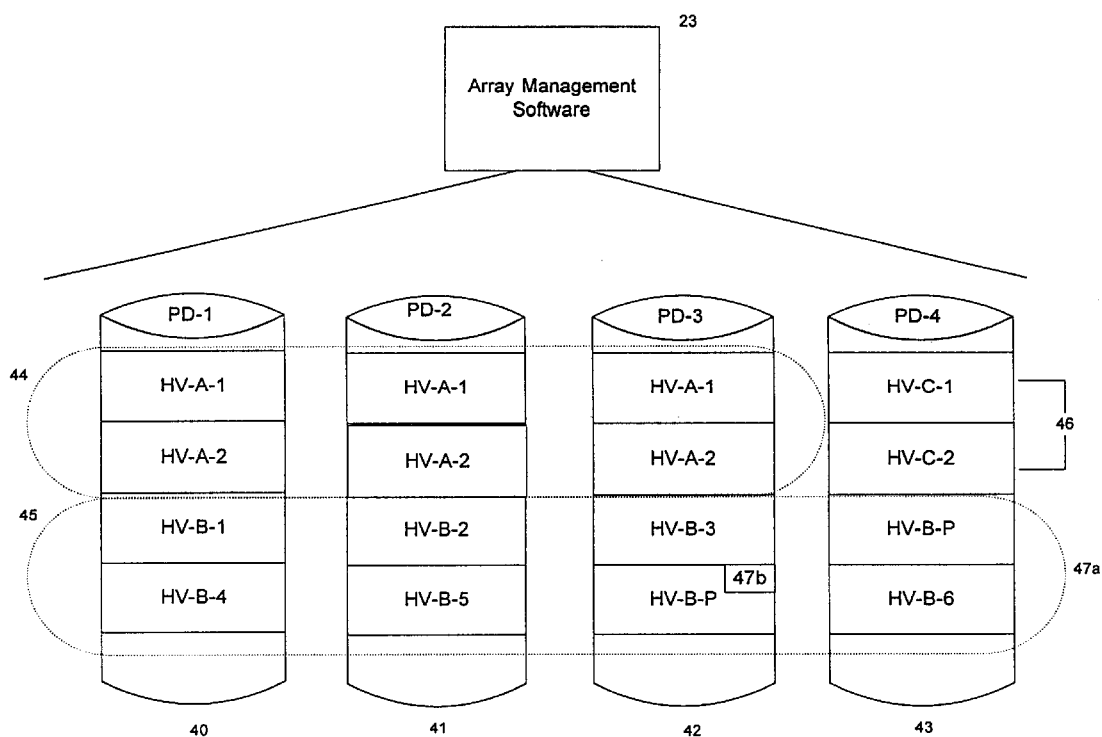
FIG. 4 illustrates an example of multiple redundancy groups within a single array of storage device.
Figure 5:
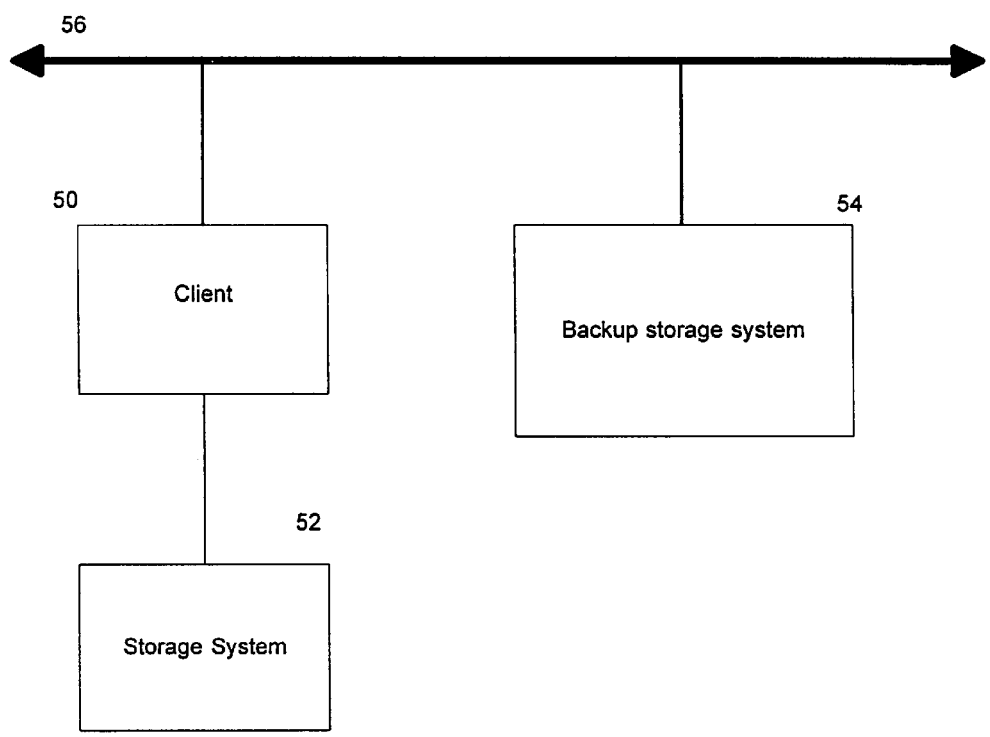
FIG. 5 illustrates an example of a backup storage system.
Figure 6:
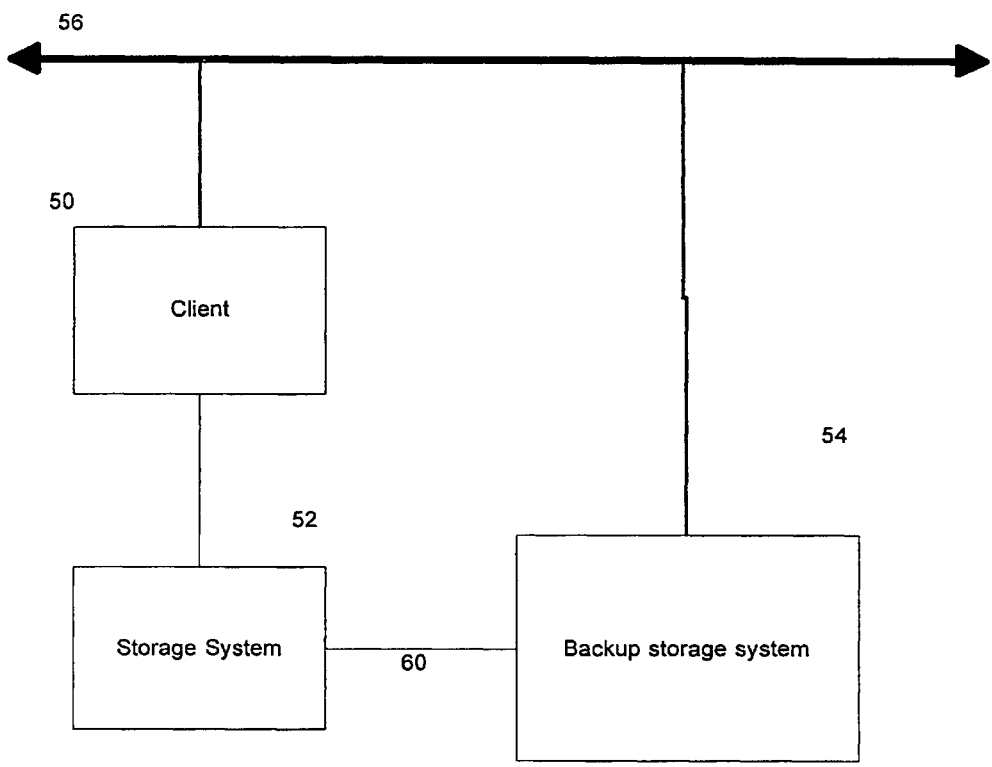
FIG. 6 illustrates one embodiment of a backup storage system that includes a mechanism for backup of data on the primary storage system.

The architectures illustrated in FIG. 5 and FIG. 6 may be viewed as focusing on a network model for storage, or a "network-centric" system. In such a system, the focus of data transfer is movement of logical data across a network. Moreover, the storage system 52 and backup storage system 54 are typically associated with a single client or host 50 architecture.

An alternative model focuses on a separation of the client or host domain and the storage domain.

Figure 8:
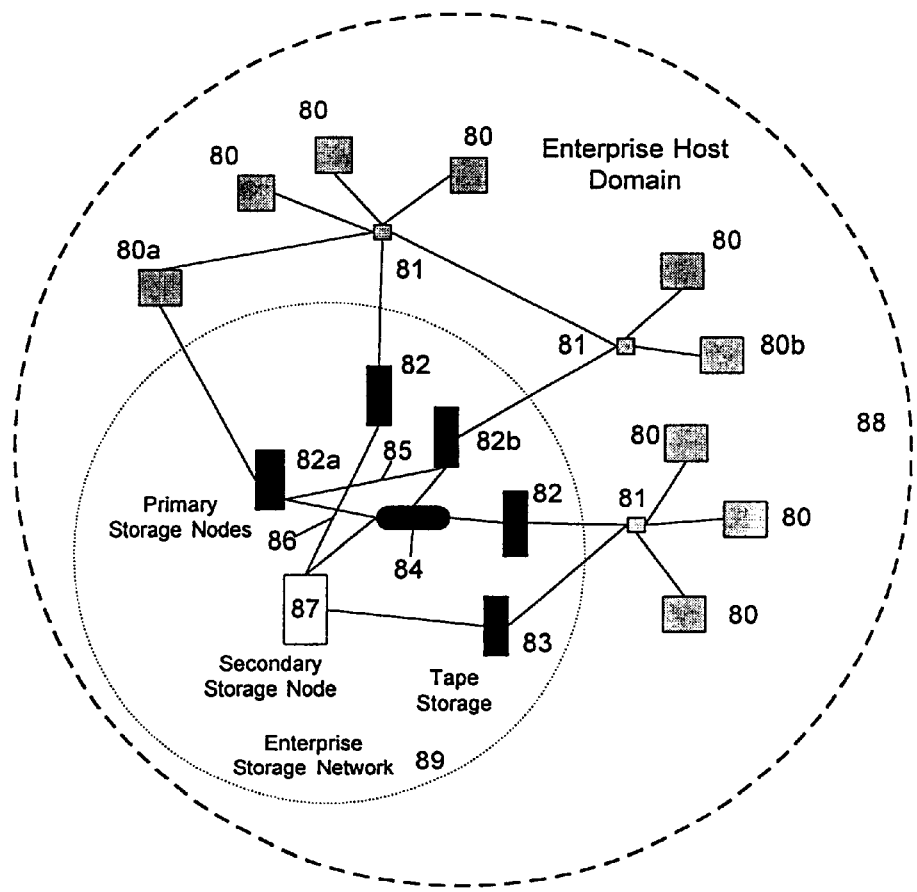
FIG. 8 illustrates one example of a computer storage system structured to have an enterprise host dome and an enterprise storage domain or network, according to one embodiment of t resent invention.

FIG. 8 illustrates one example of a system which segregates the host domain from the storage domain. In FIG. 8, a number of host computers 80 are included in an enterprise host domain 80a. "Host computers" can be any type of computers, operating systems and data management applications. For example, one host computer 80 may be a Hewlett Packard 9000 computer system running an HP-UX Operating System. Another host computer 80 can be a Sun Sparc Station running a Solaris operating system. The combination of a host, operating system and applicable data management application is referred to as a "platform." Each of the host computers 80 may constitute a different platform interfacing with the storage network 89.

The host computers 80 in the enterprise host domain 88 may be connected over a network. This network may include switching nodes 81, although any other form of network may be used.

Figure 7:
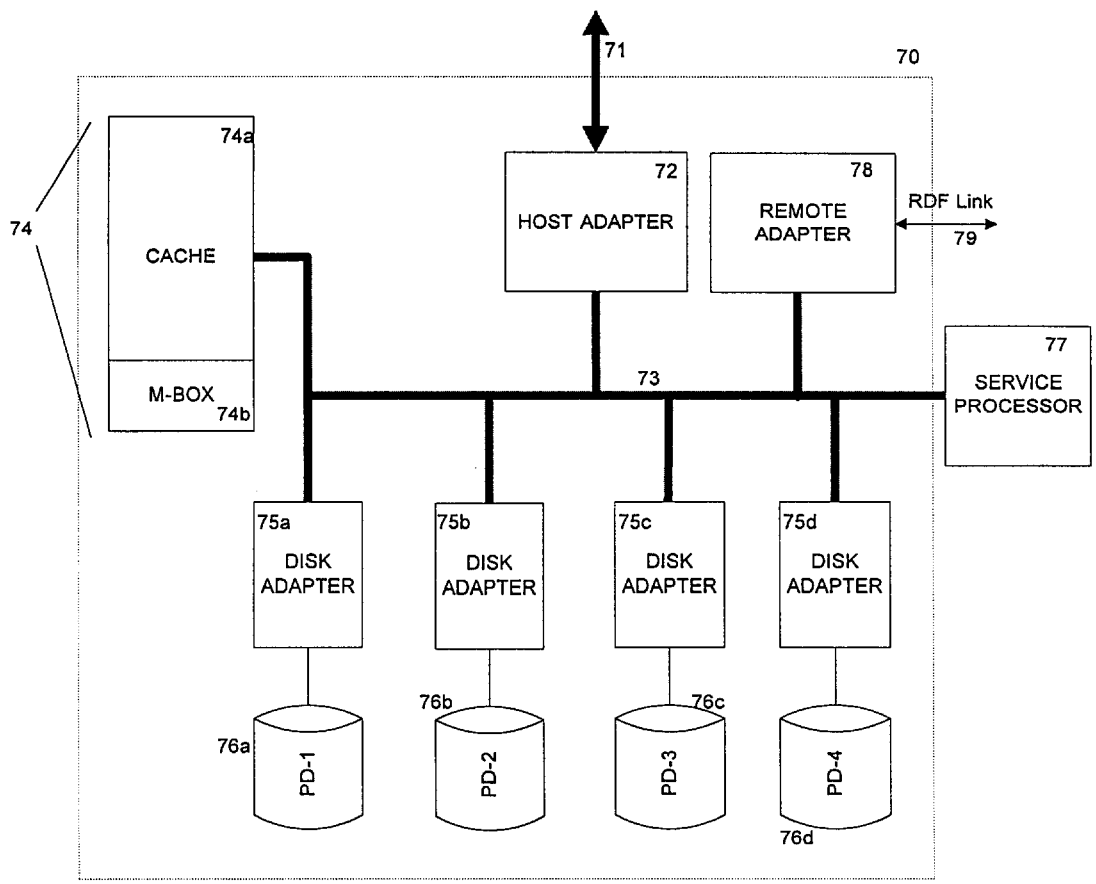
FIG. 7 illustrates an example of a storage system.

In the embodiment of FIG. 8, the host computers 80 are coupled to the enterprise storage network or domain 89 through a network or directly to primary storage nodes 82. A primary storage node is a memory device that can store a significant amount of data for use by the host 80. For example, a Symmetrix system, such as the one described above with respect to FIG. 7, may be used as a primary storage node, although this is not intended as limiting.

In the embodiment of FIG. 8, each host computer is coupled to a subset of primary storage nodes 82, for use as a main memory for that host computer. For example, host computer 80a is coupled directly to primary storage node 82a. The host computer 80a may rely on primary storage node 82a for most of its memory intensive functions, such as for accessing a very large database.

The primary storage nodes 82 may also be coupled together through a network. In the example of FIG. 8, the network includes link 85 and switch network 84. The switch network 84 may, for example, be a fibre channel network. The link 85 may be an RDF link over an ESCON line or any other channel.

The network between primary storage nodes may serve two purposes. The network may permit transfer of data between primary storage nodes. For example, a database being manipulated by host 80a, and stored in primary storage node 82a, may be transmitted to primary storage node 82b for use by host 80b. By transmitting the database across the enterprise storage network (using link 85 or switching network 84), the computational resources of the host 80a, 80b, and the available bandwidth in the enterprise host domain network, can be preserved.

The enterprise storage network 89 may also include a secondary storage node 87. The secondary storage node may be used for backup functions, hierarchical storage management, virtual disks and other functions. Thus, the secondary storage node 87 may be coupled to a tape storage unit 83. The secondary storage node 87 would coordinate sophisticated transfer of data from the primary storage nodes 82 to the tapes stored in a tape storage unit 83. (Other embodiments may use additional or alternative media for secondary storage.)

Figure 9:
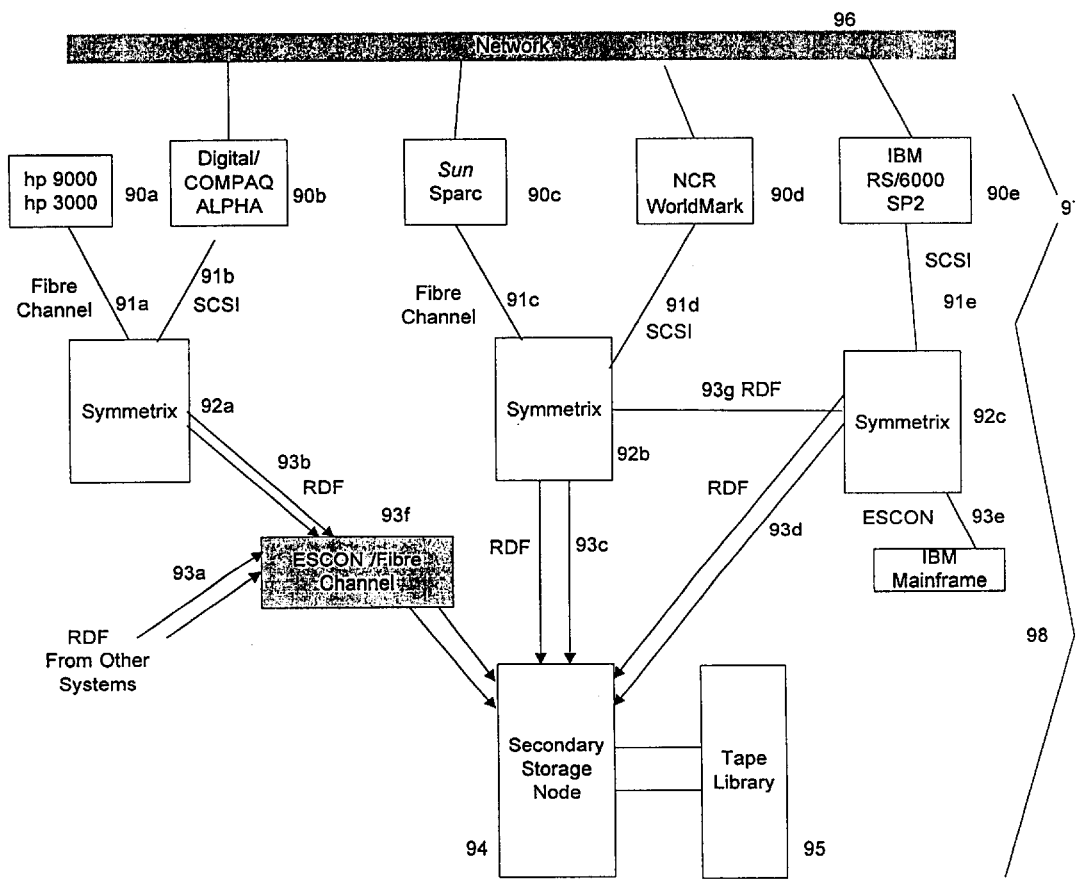
FIG. 9 illustrates another example of a computer system including an enterprise host domain and an enter's(storage domain, according to one embodiment of the present invention.

FIG. 9 illustrates one embodiment of a computer network. In this embodiment, an enterprise host domain 97 is provided. The enterprise host domain 97 includes a variety of host computers 90a-90e. The host computers may include different platforms and different corresponding mechanisms for accessing and storing data in the memory. For example, host computer 90a is a Hewlett Packard HP 9000 computer. Host computer 90c is a Sun Sparc Station which may be running a Solaris Operating System. The host computers may communicate with each other across a network 96. Such a network can be one of many computer networks known and applied for connecting computers.

In the embodiment of FIG. 9, each host computer 90a-90e is connected to a primary storage node 92a-92c. In this embodiment, each primary storage node 92a-92c is an iterative cached disk array, such as a Symmetrix memory system such as the one described above with respect to FIG. 7, although this is not intended to be limiting. Thus, for example, host computer 90a interfaces primarily with storage node 92a. Similarly, host computer 90b uses primary storage node 92a as a primary source of its data.

In the embodiment of FIG. 9, the host computer 90a is connected to the primary storage node 92a over a high speed fibre channel 91a. The host 90b, however, is connected to the primary storage node 92a over a standard SCSI connection. Each of the hosts 90a and 90b are coupled to the same primary storage node 92a. Other mechanisms could be used to connect the host computers 90a –90e to the primary storage nodes 92a –92c. For example, a complete switched network could be employed, for any of the host computers to access any of the primary storage nodes 92a –92c.

Each of the primary storage nodes 92a –92c may also be coupled together using a network. In the example of FIG. 9, the only link among the primary storage nodes is an ESCON remote data facility (ESCON "RDF") link 93g, although any other type of link may be used. Such a link may be used for transferring of data or maintaining a mirror of data either on-line or as a periodically updated mirror. Such a link may be implemented as described in U.S. Pat. No. 5,544,347 (Yanai), which is incorporated herein by reference in its entirety. Each of the primary storage nodes 92a –92c may be coupled together using any other mechanism. For example, an RDF link could be used to fully connect each of the primary storage nodes 92a –92c. In the alternative, a switch network could be used, assuming that the network is of sufficiently high speed to support the data operations among the primary storage nodes 92a –92c.

The storage network 98 in the embodiment of FIG. 9 further includes a secondary storage node 94. The secondary storage node is used for backup (and other) functions, for example by storing and restoring information to and from a tape library 95.

In the embodiment of FIG. 9, each of the primary storage nodes is connected or connectable (by a network) to the secondary storage node 94. In this example, primary storage nodes 92b and 92c are coupled to secondary storage node 94 each using an RDF link (93c and 93d respectively) which may be implemented as described above.

The primary storage node 92a is connected (together with other primary storage nodes, not shown) to the secondary storage node 94 over a switched network, which will permit each of the systems to access the secondary storage node 94.

Using an RDF (or other) link that permits high speed transfer of data over long distances, the primary storage nodes 92a –92c and the secondary storage device 94 may be physically located at great distances apart.

Of course, other topologies and other mechanisms may be used without departing from the scope of the invention.

Many of the applications for computers now focus as much or more on memory than on the ability of the system to perform computations. For example, access to very large databases has become an extremely important and valuable application for computers.

In the past, the focus of computer systems has been on interconnecting host computers each having their own associated memory, or providing network access to a single memory. This focus demands host computer and network resources.

In the storage-centric model, however, the storage component of the computer system is elevated to a status of equal importance. In such a model, the storage components of the system are capable interacting with each other with less involvement from the host domain. For example, it may be desirable to permit mirroring across one or more primary storage nodes. Similarly, data or logical objects may need to be copied from one primary storage node to another primary storage node. Where additional levels of backup are desirable, the primary storage nodes may also transfer data to a secondary storage node for backup purposes. The primary storage nodes may, correspondingly, receive data from the secondary storage nodes for restore. In a storage centric model, some or all of the resource intensive functions in such a system can be moved out of the host domain. Certain embodiments following this model can preserve host domain resources, increase scalability of memory (by adding to the storage domain without as much concern about affect on host domain resources) and reduce dependence on the particular platforms of the hosts in the host domain.

Under a storage-centric model of computer storage, it may be desirable to permit as much of the data transfer process to be performed within the storage network—and without requiring resources from the host domain. Accordingly, the primary storage nodes and the secondary storage nodes in the network may include sufficient intelligence to handle aspects of the data transfer process. For example, the primary storage nodes may be capable of managing the transfer of identified physical elements in a logical object even when those physical elements are stored in disparate locations within the primary storage device. In a storage centric model of a computer system, it may be desirable to move some (or as much as possible, in some cases) of the data transfer functions to be performed using resources among primary and secondary storage nodes within the storage domain.

The computer system may include a storage management application ("SMAPP") for managing manipulation of storage within the storage domain. The SMAPP can be implemented using software on the host computers, primary storage nodes, a separate storage controller or some combination of these, as described below with reference to FIGS. 10 and 11.

The storage management application can be implemented using three primary components—a management component, server component and client component.

In this example, the management component controls configuration of the backup, control and monitoring of the backup and copying processes in the storage domain. The management component also tracks location of copies of logical objects in the storage system including, for example, what tape or tapes contain backups of each particular logical object.

The server component of this example controls the hardware functions of the memory process, such as acts of mounting and dismounting tapes, opening and closing, reading and writing tapes and other memory media.

The client component of the SMAPP handles manipulation and identification of the backup or copy-from source. For example, the client component is responsible for identifying the applicable logical object (e.g., file system, file or database) and determining what operating system level (or logical volume manager level) physical elements are involved. (As described above, an additional layer of mapping may be performed within the storage domain at the primary storage element of 111. For example, if the primary storage element 111 is a Symmetrix product as described above, the identified physical tracks may be re-mapped within the primary storage element 111.)

Figure 10:
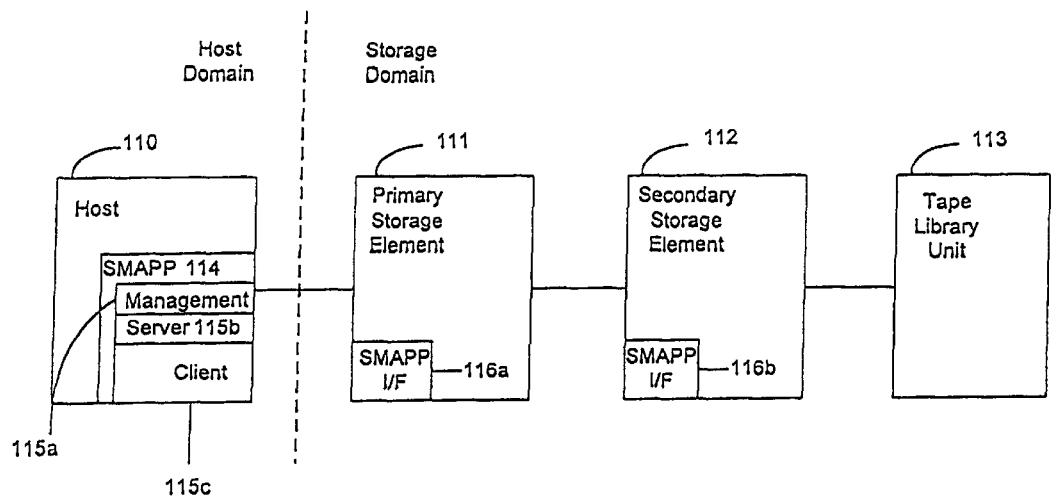
FIG. 10 illustrates one example of some of the components of a computer system that includes a host domain a storage domain, according to one embodiment of the present invention.

FIG. 10 illustrates one example of a portion of a computer system having a host domain and a storage domain. In the example, only one host 110 is shown in the host domain. In addition, only three components are shown in the storage domain. These are the primary storage element 111 (which may be, for example, a Symmetrix disk array), a secondary storage element 112 and a tape library unit 113. As described above, additional storage elements may be included, coupled together by a network. For simplicity, the example of FIG. 10 shows only one element from each of three different storage levels—host, primary storage element and secondary storage element.

In the example of FIG. 10, a storage management application ("SMAPP") 114 is primarily resident on the host computer 110. Thus, the host computer would include an Application Programming Interface ("API") which would permit management of copying, backup and restore (and other) operations. In addition, the storage management application 114 on the host 110 includes a server component 115b. Again, the host would include an API permitting management of server operations. Finally, the storage management application 114, in this example, includes a client component 115c. The client component would be responsible for identifying and manipulating logical objects and identifying (from the operating system or logical volume management level view of) the physical elements that comprise the logical object.

For simplicity, the operation of performing a backup from the primary storage element 111 to the secondary storage element 112 will be described. A similar process would apply for setting up mirroring or copying fictions between primary storage elements in a network.

In this example, the primary storage element includes an SMAPP interface 116a. Similarly, the secondary storage element 112 includes an SMAPP interface 116b. The copying of a logical object from the primary storage element 111 to the secondary storage element 112 in the embodiment shown in FIG. 10 may proceed as follows. First, a "virtual circuit" or "connection" is set up between the primary storage element 111 and the secondary storage element 112. This may be a virtual circuit established through a network coupling the primary storage element to the secondary storage element 112 (including a single RDF link between the primary storage element 111 and the secondary storage 112, for example). In addition to establishing a physical connection between the nodes, the virtual circuit identifies a session for copying a series of data (comprising, e.g., the logical object) over the identified connection.

Thus, the management component 115a on the SMAPP 114 on the host computer 110 may begin a backup session by instructing the primary storage element to establish a virtual circuit with the secondary storage element 112. The actual establishment of the virtual circuit may then be performed by the SMAPP interface 116a of the primary storage element 111 in combination with the SMAPP interface 116b of the secondary storage element 112.

The client component 115c of the host computer 110 identifies a logical object for backup. The client component 115c then maps that logical object to the operating system (or a logical volume manager level) set of physical elements. This mapping may be performed in one step. The client component 115c of the host 110 may then identify the elements for copying to the primary storage element 111, as communicated through the SMAPP interface 116a.

The server component 115b of the host 110 would identify and mount the appropriate tapes in the tape library unit 113. In this particular example, the server component 115b performs these commands by passing them to the SMAPP interface 116b of the secondary storage element 112, through the SMAPP interface 116a of the primary storage element 111, which then mounts the tapes.

The actual performance of the backup process may proceed, without further control by the host 110 of the host domain (except, in some embodiments, monitoring the process and managing the backup media, e.g., controlling changing of tapes in a tape drive). The primary storage element 111 may copy the identified physical segments to the secondary storage element 112.

Figure 11:
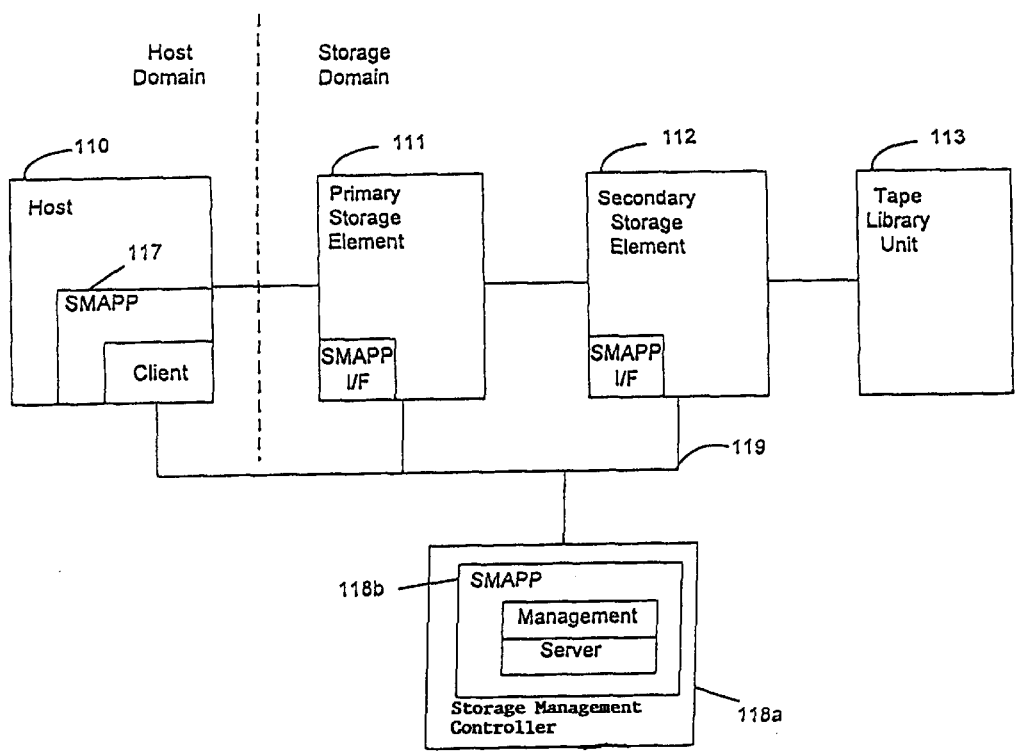
FIG. 11 illustrates another embodiment of components of a computer system that is divided into a host domain and a storage domain, according to one embodiment of the present invention.

FIG. 11 illustrates an alternative structure for control of the storage domain of a computer system according to the present invention. In this example, a storage network controller 118a is connected to the host 110, primary storage element 111 and secondary storage element 112 through a network 119. This network, for example, may follow the TCP/IP protocol. The storage network controller 118a may be any hardware, or hardware and software, combination capable of performing the requisite functions. For example, the storage network controller 118a may be a computer running a windows NT operating system, with suitable application software for performing the SMAPP functions.

In this example, a significant portion of the SMAPP software is resident on the storage network controller 118a. Thus, the SMAPP 118b of the storage network controller 118a includes a management component and a server component. Thus, management of the hardware and media can be performed by the storage network controller 118a, independent of the host computer 110.

In this example, the host 110 includes an SMAPP 117 to perform client functions. Thus, logical to physical mapping is still performed in the host domain by the host computer 110. As the client component of the SMAPP 117 is responsible for identifying logical objects and performing logical to physical mapping, this can be a sensible arrangement. The logical to physical mapping depends on the particular host platform and the host necessarily has elements capable of performing the requisite mapping.

In other embodiments, however, the client component can be included in the storage network controller 118a, or in a separate device capable of performing logical to physical mapping for one or more platforms. Where this is done, the identification and transfer of data for copying and backup purposes can be performed completely separately from the host domain. In many systems, however, it will be more efficient to use the memory mapping mechanisms (client component) on the host computer.

Other arrangements of the SMAPP software are possible. For example, the components of the SMAPP software may be distributed across the primary storage elements in the storage domain, the secondary storage element or elements in the host domain or some combination thereof.

Figure 12:
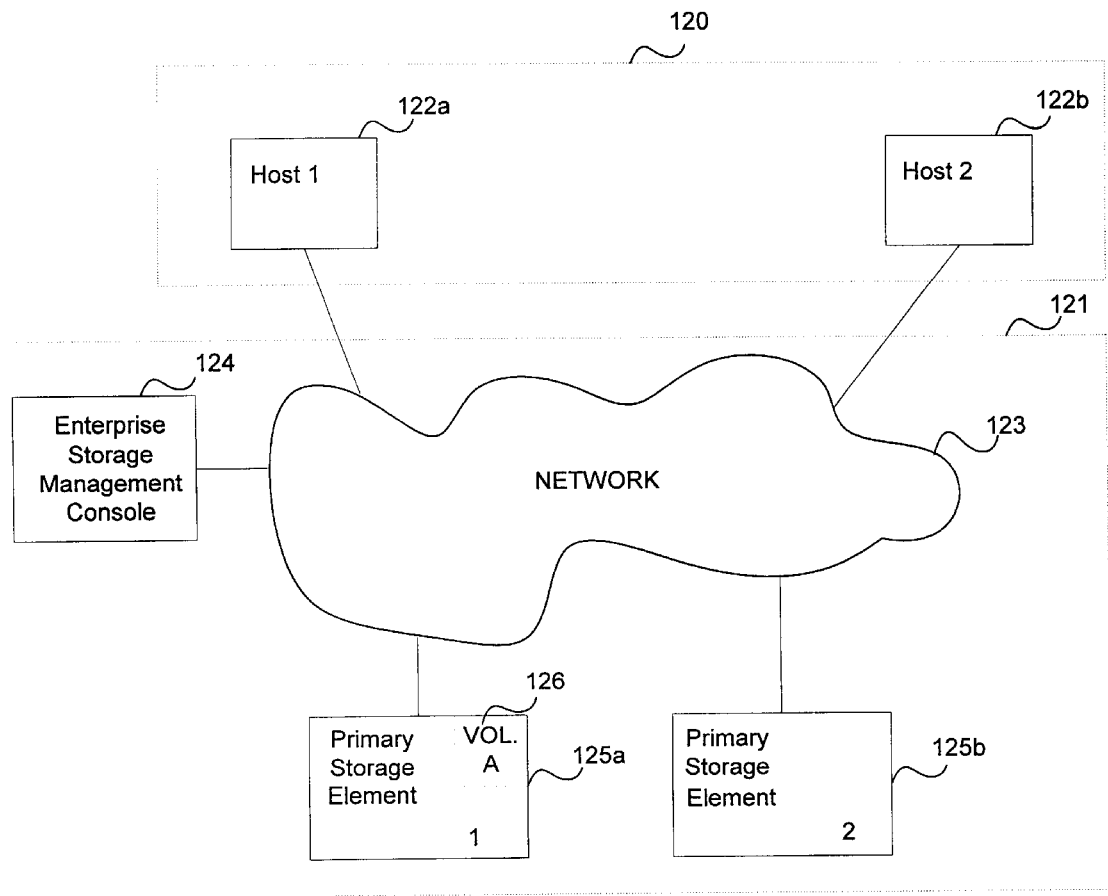
FIG. 12 illustrates one embodiment of a computer system that includes a host domain, storage domain and storage management console.

FIG. 12 illustrates another simplified example of a computer system divided into a host domain 120 and storage domain 121. This simple example facilitates description of one embodiment of the present inventions, but is not intended to be limiting.

In FIG. 12, the host domain 120 includes two host computers—122a and 122b. These host computers may be any computer system for application processing, as described generally above.

The storage domain 121 of this particular example includes a network 123, enterprise storage management controller 124 (which can correspond to the storage network controller described above) and two primary storage elements 125a and 125b. The primary storage elements 125a, 125b handle the major storage requirements for the host computers 122a, 122b. In some systems, the primary storage elements may be generally affiliated with particular host computers. For example, host computer 122a may use primary storage element 125a for most of its needs, and use primary storage element 2 125b only in special circumstances or for overflow. Similarly, host computer 122b may rely primarily on primary storage element 125b. In this circumstance, the network 123 which couples the host computers 122a, 122b to the primary storage elements 125a and 125b may be configured to allow more rapid access between host computers and affiliated storage elements. Indeed, the network 123 may include one or more subnetworks, for example including a direct connection from host 122a to the primary storage element 125a, in addition to other connections to one or more other networks.

In the example of FIG. 12, a logical volume A 126 is stored on a primary storage element 1 125a. Additional copies of logical volume A 126 may be stored elsewhere in the storage domain 121, for example mirrored on primary storage element 2 125b. In addition, subcomponents (e.g., hyper volumes) could be stored across more than one storage element. In any event, for this example, the logical volume A 126 is stored entirely on primary storage element 1 125a.

Accordingly, whenever host 1 122a or host 2 122b wishes to access data in volume A 126, the access request will be transmitted over the network to primary storage element 1 125a.

In the event that the connection by which host 1 122a accesses and receives data from primary storage element 1 125a is over a network that allows access to more than one device, some addressing scheme is applied for the host 122a to specifically address the primary storage element 125a. For example, if the network 123 includes a fibre channel network that permits access to a primary storage element 125a, the primary storage element 125a may be assigned a 64-bit worldwide name ("WWN"). The worldwide name is an address for the primary storage element 125a over the fibre channel network. Of course, other addressing schemes may apply for the applicable network, such as the use of an IP address.

Thus, when the host 122a seeks to access primary storage element 125a, the host will specify an address corresponding to the applicable primary storage element, here an address corresponding to primary storage element 125a. In addition, the host 122a will need to specify the data to be accessed. In most embodiments, this will include an identifier of the particular logical entity being accessed, such as an identifier of a logical volume to be accessed. In the example of FIG. 12, the host 122a may specify that logical volume A 126 is to be accessed.

In some embodiments of the present invention, specification of the particular logical entity may be through a logical unit number identified by the host computer 122a. In this case, and continuing with the example of a fibre channel network, accessing data from primary storage element 125a by host 122a may use specification of a storage element address (here, a worldwide name) and an applicable logical entity (here, volume A, as identified by a logical unit number).

It may become necessary, for a variety of reasons, to move the location of the primary copy of volume A 126. For example, if primary storage element 1 125a is to be replaced in the system, volume A 126 would have to be moved to a replacement or other primary storage element. In other circumstances, it may become desirable to move volume A 126 to a different primary storage element in order to accommodate load balancing either among the primary storage elements 125a, 125b or in the network 123. As one example, more than one host may need to share a volume. Depending on which hosts are accessing the volume (and the characteristics, such as frequency, of access), the best location for the volume may vary. In other embodiments, it may be desirable to move some portions of volume A 126 to another primary storage element 2.

This process can, however, be complicated. When host 1 122a accesses the volume A 126 stored in primary storage element 1125a, host 1 issues an access request that is formatted to be interpreted by the appropriate switches (or other devices) in network 123 to route the access request to the correct destination (primary storage element 1 125a). If volume A 126 is moved to a different primary storage element, e.g., primary storage element 2 125b, access requests from host 1 122a would be routed to an incorrect destination. Accordingly, movement of volume A 126 in primary storage element 125a to primary storage element 125b would require substantial involvement and management by the host computers 122a, 122b.

ELVIDs

According to certain embodiments, the above problem is addressed (in part) through assignment of enterprise logical volume identifiers ("ELVIDs"). An ELVID is a unique identifier associated with a logical entity, such as a logical volume, used by a host in the host domain 120. For example, logical volume A 126 in FIG. 12 may be assigned an ELVID that is a unique identifier for the logical volume stored on primary storage element 125a.

As described more fully below, in one embodiment, the ELVID may be used to translate between the logical name of the entity (from the application view) and its physical location (from the storage domain view; although further translation into a physical location may be provided within the storage domain, such as mapping to a location within a storage device). The translation from logical name to physical location may be implemented using software, firmware or hardware between the logical volume manager (or file system, where there is no logical volume manager) level and the physical storage level (although this translation can also be implemented with software, firmware or hardware located at a variety of different levels, or among levels, as well).

Although ELVIDs are described below with respect to identifying logical volumes at the logical volume manager and physical storage system level, ELVIDs may be assigned to other entities, such as the other logical objects described above, including components of logical entities such as hypervolumes, also described above and also being "logical objects" themselves. Accordingly, an "ELVID" is simply a unique identifier associated with a logical object, segment or grouping of data. The ELVID identifier should be unique for the storage domain in the applicable computer system (no matter how that storage domain is implemented, through use of one or more primary storage elements or otherwise). The ELVID may also be independent of the actual physical location at which the data is stored. This independence need not, however, be complete independence. For example, the ELVID may be assigned based on the initial location of the logical entity. If the logical entity were to move, however, the ELVID would remain the same. Thus, ELVID is "independent" of physical location in the sense that, once assigned, the ELVID would remain the same even if the physical location of the data changes. In some embodiments, the ELVID may reflect the identity of a storage domain or subgroup of storage elements. As long as the ELVID remains the same when the data is moved it is "independent" of physical locations.

Figure 13:
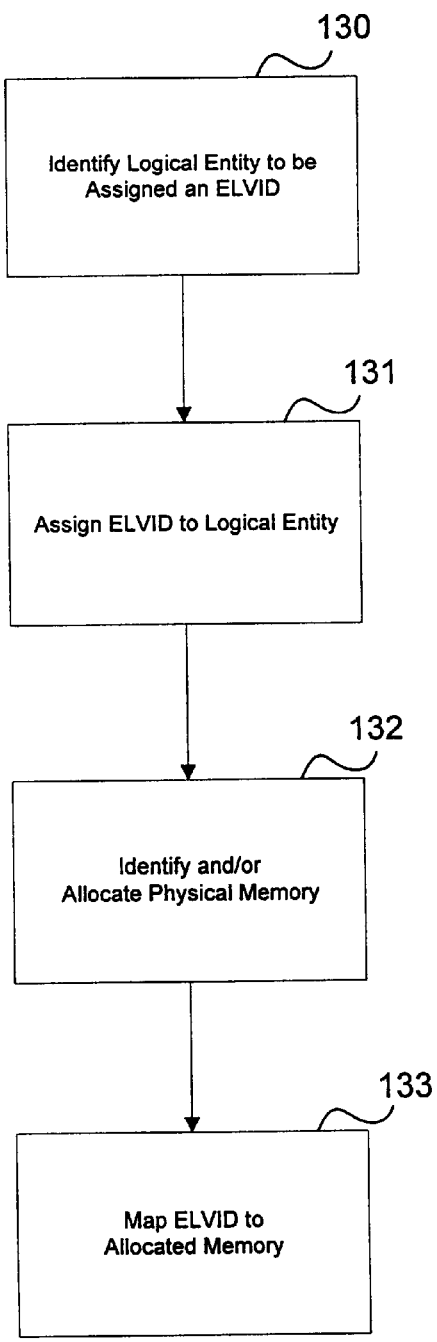
FIG. 13 illustrates one embodiment of a method that assigns enterprise logical volume identifiers ("ELVIDs") as defined below.

FIG. 13 illustrates one embodiment of a method for assigning ELVIDs in a computer system. At step 130, the logical entity to be assigned an ELVID is identified. For an existing system, this would correspond to identifying a logical entity being used by a host application and for which memory is required (or has been allocated) in the storage domain of the computer system. In a running system, this may correspond to the opening of a new file system or other structure to be used by the host computer. The logical entity could be any logical object, including hyper volumes and other logical entities used in the memory hierarchy of the computer system. Since applications generate data for manipulation, the ELVIDs may be associated, for example, with entities at the application level, such as a particular database or file. Alternatively, or in addition, ELVIDs may be assigned to logical entities at the file system level. For example, ELVIDs may be assigned to logical volumes or partitions within logical volumes. Similarly, ELVIDs may be assigned only or in addition to logical entities at the logical volume manager level, such as hyper volumes. In many cases, the logical entity to be assigned an ELVID is identified at the host computer—the computers primarily responsible for using, reading and writing the data in each logical entity. Because storage elements and the enterprise storage management console or storage network controller may include intelligence and may constitute complete computer systems themselves, these entities may also define or identify logical entities to be assigned an ELVID.

At a step 131, the ELVID is assigned to the logical entity. As described above, the ELVID is preferably a unique identifier for the logical entity. In the embodiment of FIG. 12, the enterprise storage management console 124 (or other single agent within the system) may be used for assigning all ELVIDs. By using an enterprise storage management console, the uniqueness of the ELVIDs for the entire storage domain may be more easily assured. In other embodiments, however, the enterprise storage management functions could be distributed across the host computers, primary storage elements or other devices in the complete computer system.

According to one embodiment of the present invention, the number of bits for the ELVID is selected to be the same as the number of bits used by the host computer for identifying storage elements. For example, if a fibre channel is being used to access storage elements and a worldwide name of 64 bits is used to address the storage element, 64 bits may also be used to address the ELVID. In another embodiment, the ELVID may include the same number of bits as the addressing scheme for the physical storage elements (e.g., worldwide name) plus the number of bits for a logical unit number. By using the same number of bits as used by the host computer for identifying storage elements or logical units on storage elements, some host operating systems may be able to more easily use an ELVID in the ordinary identifier mechanism for accessing logical entities such as logical volumes.

Some operating systems may employ a different mechanism that has fewer bits for identifying logical entities. For example, an operating system may allow only logical unit numbers to identify logical units. For these systems (as well as other systems), an ELVID having a greater number of bits may still be assigned, with an additional mapping step between the ELVID and the logical unit number, as described below.

At a step 132, the actual physical memory that will (at least initially) store the logical entity is identified and/or allocated. This step may be performed in a conventional manner. In the embodiment of FIG. 12, however, the enterprise storage management console 124 may be responsible for allocating memory. This allocation can be performed using any number of optimization algorithms for determining the best location for the logical entity. In other embodiments, another mechanism may be used. For example, if a primary storage element is specifically affiliated with a host computer, physical memory may always be allocated on that primary storage element, or at least given priority for assignment on that storage element.

At a step 133, the ELVID is mapped to the allocated memory. This step of mapping configures the mechanism that permits a host making a request for access to a logical entity (e.g., by ELVID) to locate or verify the physical location of that logical entity.

Figure 14:
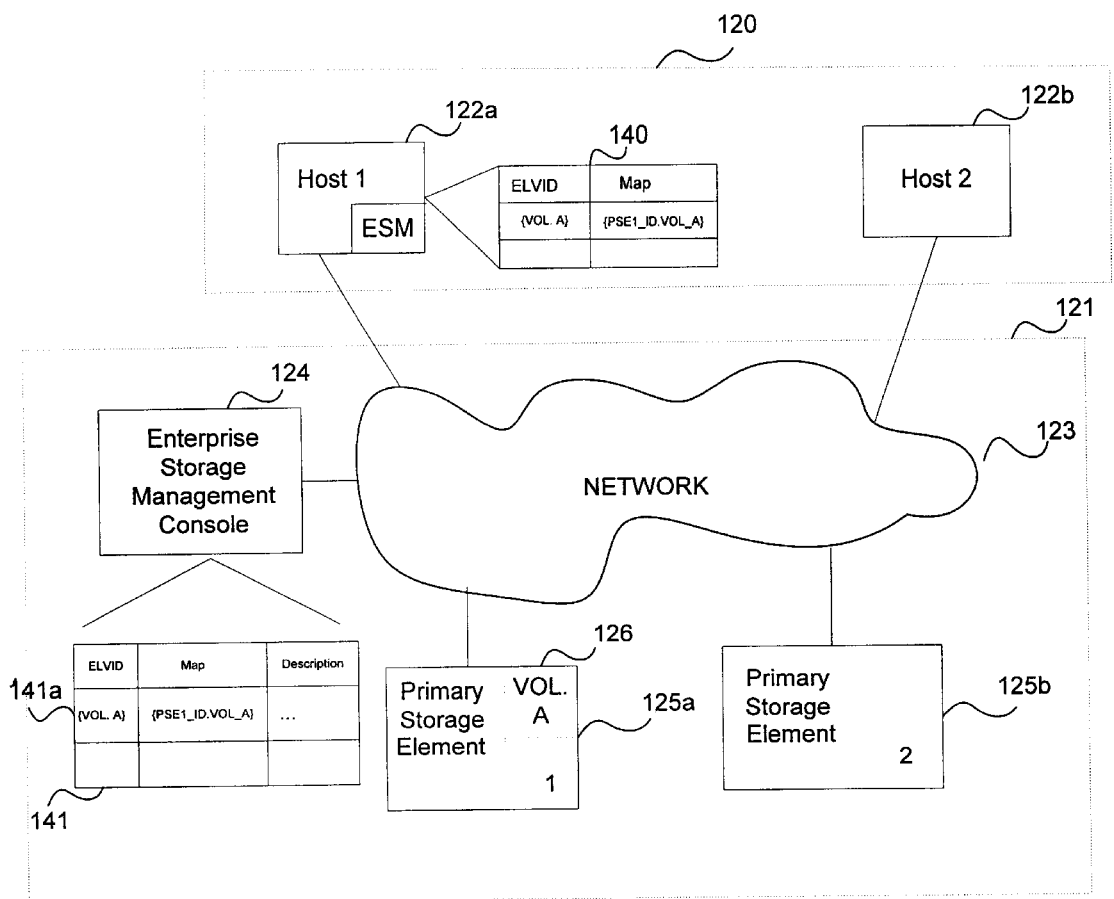
FIG. 14 illustrates one embodiment of a computer storage system corresponding to FIG. 12 that include ELVID configuration tables.

FIG. 14 illustrates one example of how an ELVID may be mapped to physical memory in an example system. The example system corresponds roughly to the computer system described above with reference to FIG. 12. In this example, the enterprise storage management console 124 has assigned an ELVID, {VOL. A}, for a logical volume A to be accessed (at least initially) by host 1 122a.

In this example, the enterprise storage management console 124 retains a database tracking logical entities that have been assigned ELVIDs in the storage domain 121. "Database" includes any structure for storing data, including tables, arrays, linked lists, objects and other constructs and may be stored on a single, or across multiple, memories. In the example of FIG. 14, a table is shown but this is not intended as limiting. The table 141 includes a row 141a that illustrates the entry for the ELVID assigned to the logical entity volume A. The assigned ELVID is identified in the first column 141.

In the example of FIG. 14, the table 141 includes a column that allows description information for the applicable ELVID. For example, the description field may include a description of the applicable logical entity (e.g., "database for fourth quarter financial results"). In addition, the description may include information identifying the host computer (or other entity) that created the logical entity or other information that specifies or assists in determining what to do with the logical entity if found.

By assigning both an ELVID and a description, the table 141 may be used to identify segments of data that may otherwise become "lost" in the computer system. For example, a logical volume (e.g., volume A of 126) may store a database. If the original host that created the logical entity becomes unavailable (for example, with a catastrophic failure of that host), the failure could leave logical entities scattered about the storage domain 121 with few mechanisms for determining what those logical entities are. Including a description column in the table 141 permits identification or recovery of logical entities stored about the storage domain 121, without the need to access the host which created it.

This information would also permit the enterprise storage management console 124 or other mechanism to inventory the data that is stored across the storage domain. For example, enterprise storage management console 125 or another mechanism could periodically verify that all of the logical entities stored in the storage domain are still being used by one or more host computers. In this embodiment, the entity performing the inventory could use the description field to determine not only what the logical object is generally, but also how to verify that it is still in use (for example, which host computer or computers to query as to whether the data is still required). A variety of mechanisms may be employed to perform this inventory process. For example, primary or other storage elements in the storage domain may determine or track when it has been a long period of time since a logical entity had been accessed. Once the applicable threshold has been crossed, the storage element could notify an enterprise storage management console that storage of that logical entity in the applicable storage element may no longer be required.

ELVID to Physical Location Mapping.

Figure 15A:
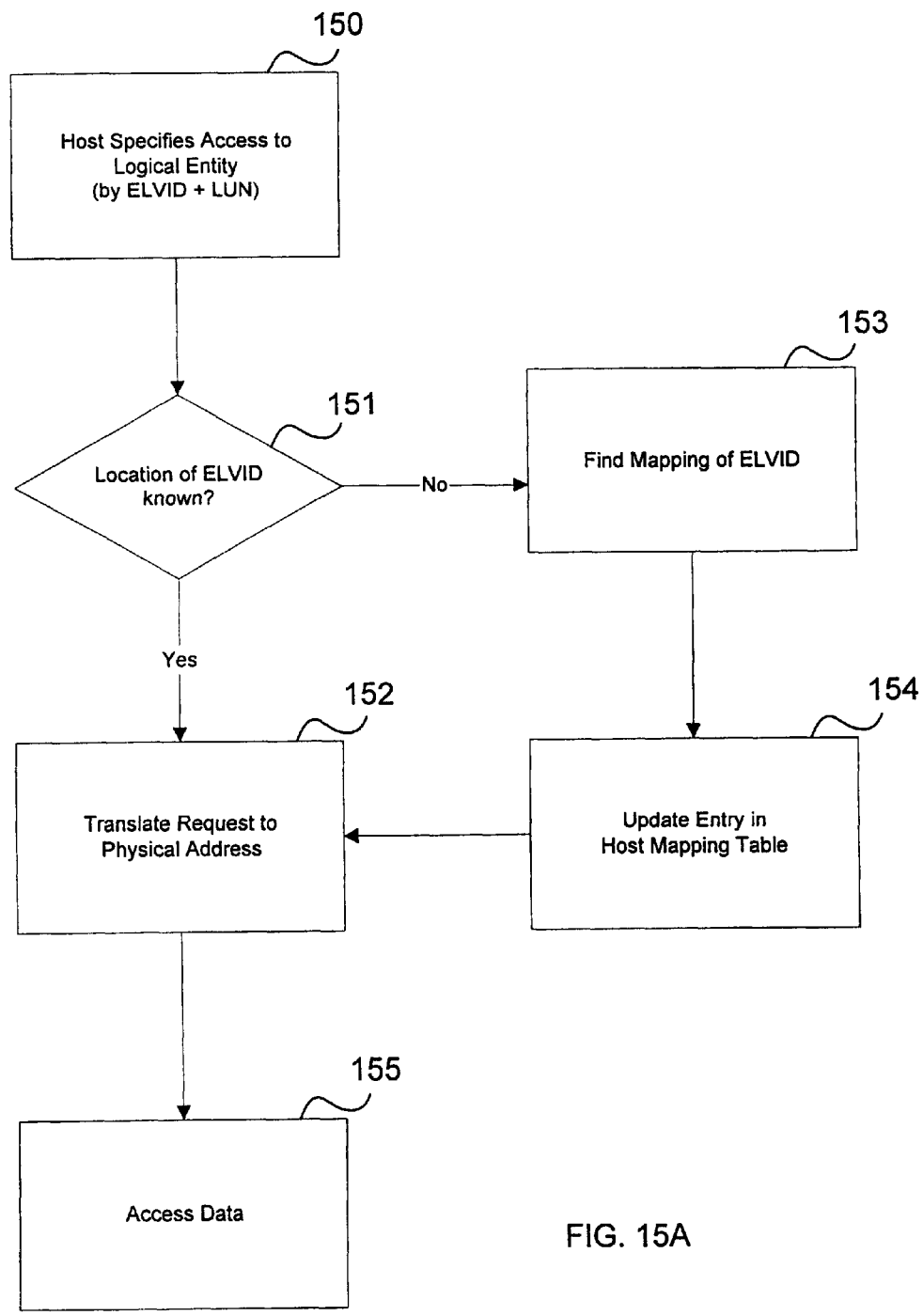
FIG. 15A illustrates one embodiment of the method of accessing logical entities using an ELVID or ELVID logical unit number.

FIG. 15A illustrates one embodiment of a method of using ELVIDs to access data in a computer system. At a step 150, a host specifies access to a logical entity. This may be performed as a conventional step of conventional computer systems where an application program (for example) on a host requires access to data. In step 150 of this particular embodiment, however, that access may be performed using an ELVID and a logical unit number (or information that may be mapped into an ELVID with or without a logical unit number).

Conceptually, an ELVID may be sufficient to specify a logical entity -a unique ELVID may be assigned to each logical entity in the storage domain and may be used as such. (Under other embodiments, however, an ELVID may specify a group of logical entities, with another field specifying a subunit of the identified logical entity. For example, an ELVID could specify a logical volume with a subfield dedicated to specifying a file or hyper volume within the logical volume.)

In an embodiment described above, however, the ELVID is allocated the same format (e.g., the same number of bits) as used by the host for identifying a physical storage element (e.g., a worldwide name). If this is the case, the host application and operating system software can use an ELVID in place of what would otherwise be a physical storage element address. Allowing specification by the host computer of a logical unit number in addition to an ELVID to identify a logical entity allows a host computer to see the same format as when the host computer originally accessed the data, without use of an ELVID—in some cases, reducing the amount of alteration to the host application or operating system software necessary to implement and use ELVIDs.

Figure 15B:
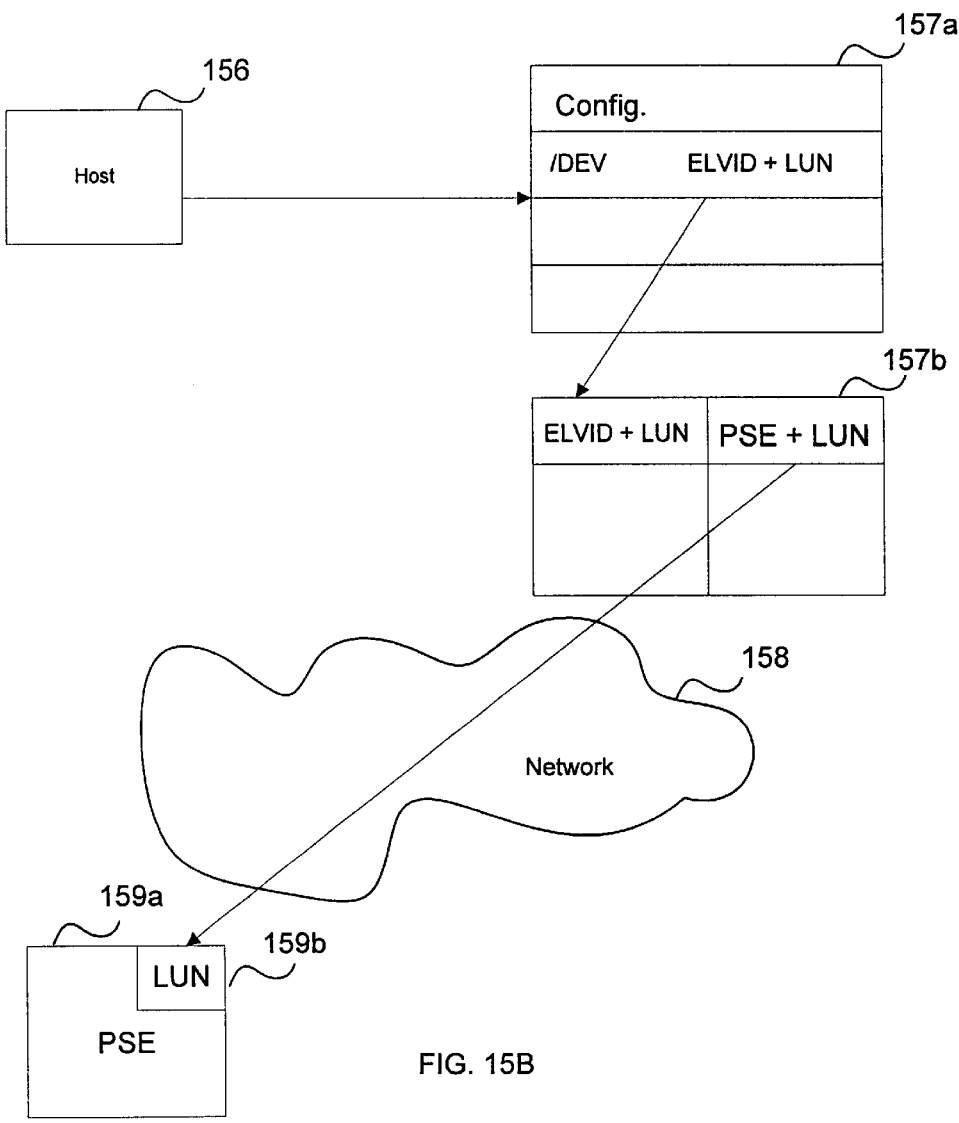
FIG. 15B illustrates an example of application of the method of FIG. 15A to access data over a computer network.

FIG. 15B illustrates one example of accessing information according to one embodiment of the method illustrated in FIG. 15A. In FIG. 15B, a host computer 156 is accessing a physical storage element 159*a*, through a network 158. Initially, the host computer 156 specifies access to a logical entity. In many host computer systems, a configuration table specifies access to at least certain logical entities. In this example, a configuration table 157*a* includes an entry for a logical entity "/DEV." In conventional systems, the configuration table 157*a* includes information specifying the physical location for that data. In this example, however, an ELVID plus a logical unit number is used in place of what would otherwise specifically identify the physical storage location. In this manner and for this example, the configuration table 157*a* is used for the host to specify an ELVID plus logical unit number, as in step 150 of FIG. 15A.

Returning to FIG. 15A, it is determined whether the location of the specified ELVID (plus logical unit number) is known, at a step 151.

Returning to FIG. 15B, this would correspond to examining a table 157*b* to determine whether there is an entry identifying the location of the logical entity.

Returning to FIG. 15A, if the location of the logical entity is not known, then a mapping (i.e., determination of the physical location for the ELVID) is found, at a step 153. This step may be performed by accessing a centralized database that includes location of the ELVIDs, such as a database stored at the enterprise storage management console 124 of FIG. 14. In other embodiments, some or all of the physical storage elements in the storage domain may be polled to determine whether they have the appropriate logical entity.

Once the mapping of the ELVID has been found at step 153, the host mapping table may be updated at a step 154. In the example of FIG. 15B, this would correspond to adding an entry in the table 157*b*.

If the location of the ELVID is known, or once the location of the ELVID has been determined, the request can be translated to the physical location of the logical entity, at a step 152.

Referring to FIG. 15B, this may be done as a simple table lookup from table 157*b*. That is, the ELVID or ELVID plus logical unit number can be converted to an appropriate identifier for the physical location of the data.

Returning to FIG. 15A, at a step 155, the data is accessed.

In the example of FIG. 15B, this may be performed by using the physical address identified from the table 157*b* to access the physical storage device 159*a*, using network 158. Using the example embodiments above, the physical storage element may be accessed using the appropriate network address for the device together with a specification of the logical entity stored on the device 159*b*.

As described above, and in some embodiments, the particular operating system used by a host may not accommodate a sufficient number of bits for an ELVID for a particular storage domain. For example, particular operating systems may permit only a sufficient number of bits to identify a logical unit, and fewer bits than the number necessary to identify a worldwide name address on a fibre channel. In these embodiments, and if the particular ELVID format chosen for the system includes the same number of bits as for a worldwide name, an additional layer of mapping may be performed. That is, a host operating system may specify a logical entity in one format, followed by a conversion to an ELVID together with a physical location.

Figure 16:
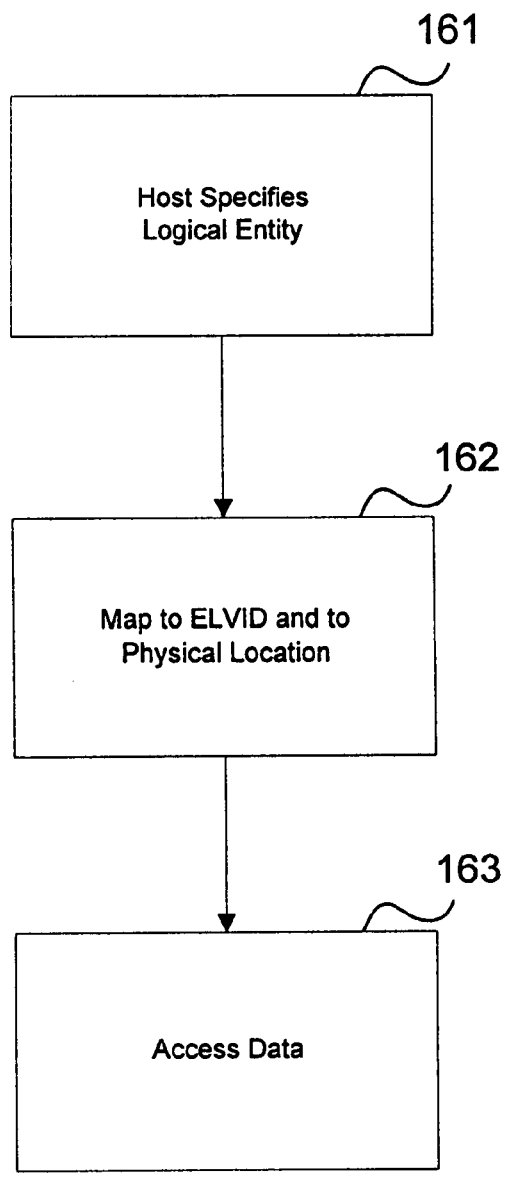
FIG. 16 illustrates one embodiment of a method for accessing data using an ELVID and mapping the ELVID to a physical location.

FIG. 16 illustrates one embodiment of a method for accessing data in such a system. At a step 161, the host specifies the logical entity to be accessed.

At a step 162, the specified logical entity is mapped to an appropriate ELVID and physical location. Thus, if the host entity specifies a logical unit number only, the operating system can map that logical entity number to an ELVID or ELVID combined with a logical unit number in the same manner that the operating system would otherwise map the specified logical unit number to a physical address to access the primary storage element over a network. In addition to mapping to the applicable ELVID, the actual physical location is also identified.

In this example, a purpose of mapping to an ELVID rather than directly to a physical location address is to permit the identification of the appropriate logical entity independent (as defined above) of physical location. Accordingly, if the logical entity has been moved, this may be detected in the manner described below. In addition, changes to the physical location can be implemented and updated more easily. The change in the physical location can be mapped to the ELVID. When the logical entity with the applicable logical unit number is accessed, the ELVID may be used as a key to access the appropriate entry in the table and the corresponding updated physical location is correctly accessed.

At a step 163, the data is accessed using the physical location determined at step 162.

Referring again to FIG. 14, the second column of table 141 includes the mapping location (or storage element location) for the logical entity. For the example of the logical entity volume A, an entry indicating its location—{PSE1_ID.VOL$_{13}$ A} —identifies the location of the storage for volume A in the storage domain 121, in this example, the location being within the primary storage element 1125*a*.

In this example, the mapping information includes a separate identifier ("PSE1_ID") of the storage entity in the storage domain 121 that stores the logical entity. For example, if the primary storage element 125*a* is a Symmetrix, the initial information in the mapping field of 141*a*, PSE1_ID, is an identifier for that Symmetrix.

In one embodiment, the storage element identifier can be the network address for the primary storage element 125*a*.

For example, in a fibre channel network, the initial field {PSE1_ID} can be the appropriate world wide name for primary storage element 1125*a*.

In the example of FIG. 14, the mapping information—"VOL_"—that identifies the logical entity or storage location within the applicable storage element. Thus, the entire mapping information $\{PSE1\_{ID.VOL13}\}$ includes two fields, one corresponding to the particular storage element (e.g., a network address for that storage element) and one corresponding to a location within the storage element (e.g., a logical unit identifier that may be used by the storage element to access the applicable data).

In some embodiments, by including the mapping information, the host application using the ELVID will have and use information that permits it to directly access the appropriate storage element and data over the network 123.

In the example of FIG. 14, the host 122*a* also includes a table 140 that shows a mapping of ELVIDs to storage areas. This would permit a storage management application within host 122*a* to directly access the primary storage elements by converting the ELVID to the physical location for the corresponding logical entity. In other embodiments, another mechanism (such as an enterprise storage management console) may perform the function of mapping ELVIDs to physical locations for entities in the host domain 120.

ELVID Checking.

In certain of the above embodiments, the application or file system level software used an ELVID to identify logical as a part of identifying logical entities. The ELVID was then mapped to storage locations for access to the data in the logical entity.

One alternative use of ELVIDs is for verification at the correct logical entities being addressed at the physical location. Thus, if the physical location of a ELVID changes and a particular host has not had its configuration table updated, the host will attempt to access the incorrect physical location. This can be detected using an ELVID, followed with an appropriate correction to the host that had attempted to use the incorrect address.

Figure 17:
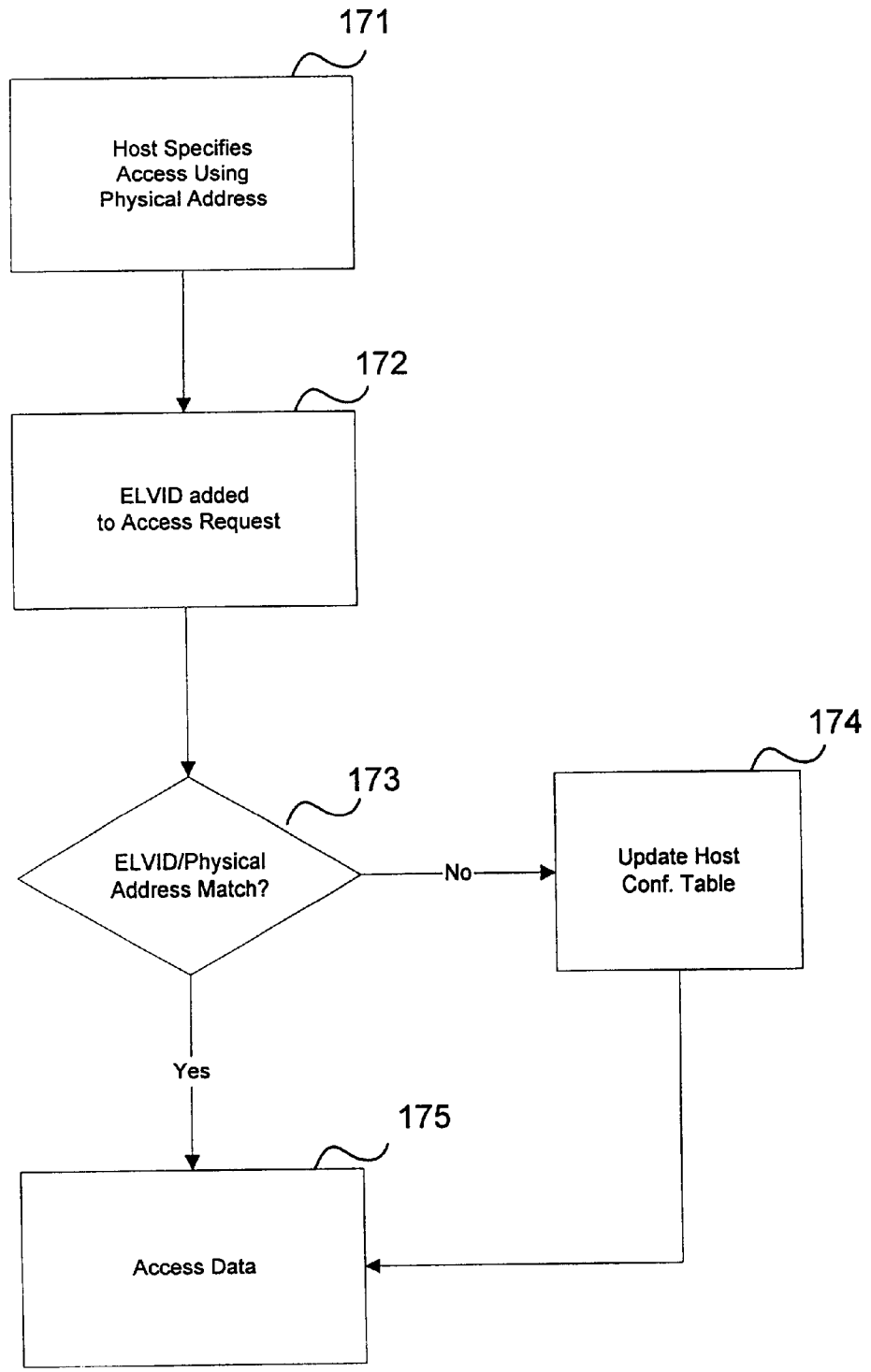
FIG. 17 illustrates one embodiment of a method for verifying access using an ELVID.
Figure 18:
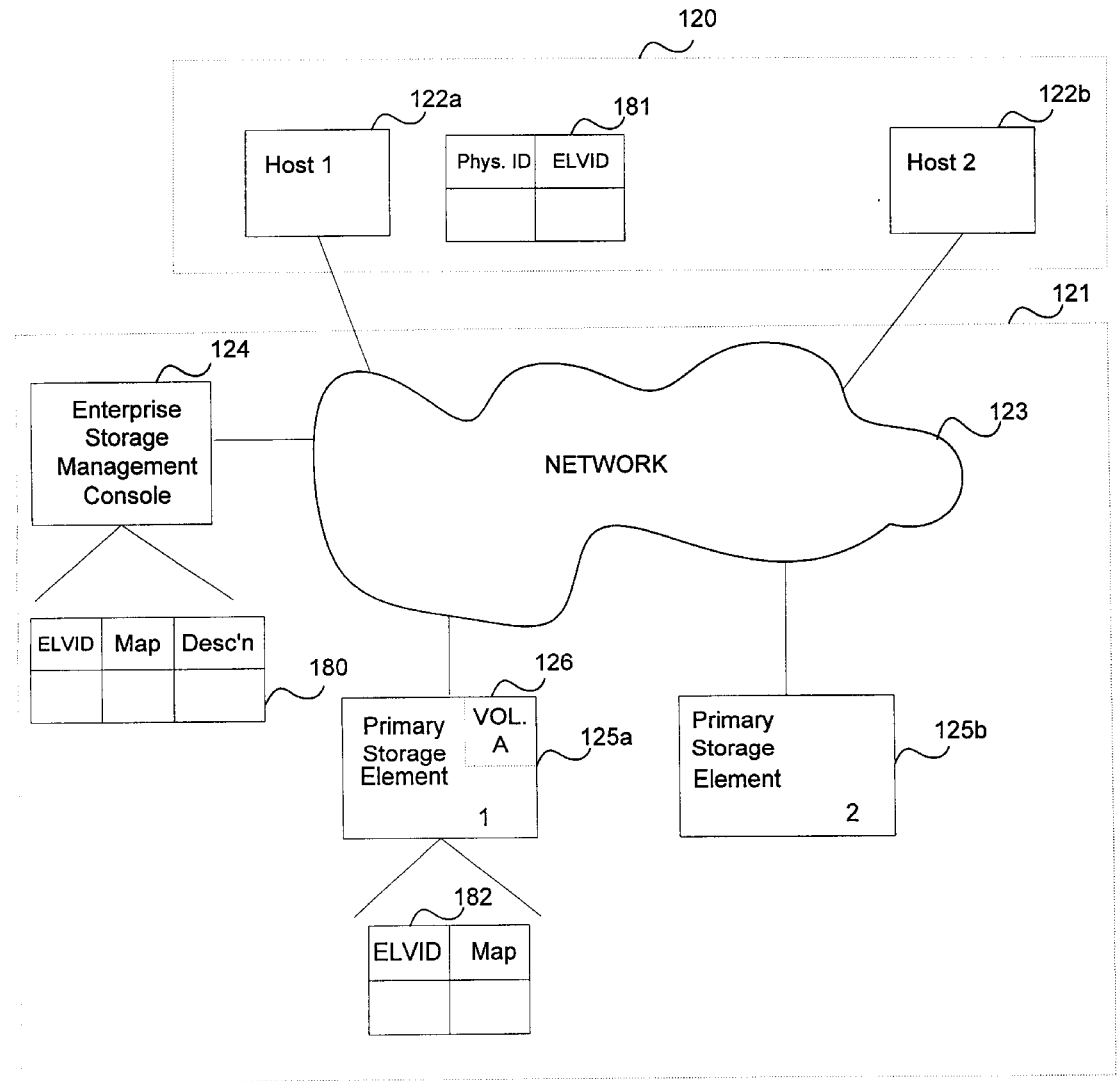
FIG. 18 illustrates an example of applying the method in FIG. 17 to one embodiment of a computer system that uses ELVIDs.

FIGS. 17 and 18 illustrate one example of a method of using ELVIDs for verification of the location of the logical entity.

In FIG. 17, at a step 171, the host specifies access using a physical address. This step may be performed in the conventional manner, using the mechanism the host would ordinarily use for addressing data.

At a step 172, however, the ELVID is added to the access request. Referring to FIG. 18, the host 122*a* may use table 181 to identify an ELVID with a particular physical address identifier specified in the data access request by the host.

At a step 173 of FIG. 17, the physical address and the ELVID are matched to assure that the host is accessing the correct data. In the embodiment of FIG. 18, this step may be performed by the enterprise storage management console 124 using its ELVID table 180. In this embodiment, the host may be required to check with the enterprise storage management console before accessing a logical object or volume (e.g., before beginning a session with a volume or before each access to a volume). In an alternative embodiment, a similar table 182 may be stored at the primary storage element 126. For simplicity, an example of one way of performing the step identified in 173 is described with reference to use of the table 182 on primary storage element 125*a*.

For this embodiment, the host 122*a* would specify a data access request using the physical ID, with the ELVID added from table 181 (as described with respect to 171 of FIG. 17).

This request is then transmitted through network 123 to the primary storage element 125*a*.

Receiving the data access request, the primary storage element 125*a* may then take the specified location and determine the ELVID at the address specified by the host 122*a*.

If the ELVID and physical address match at the primary storage element 125*a*, the appropriate logical entity has been addressed by the host 122*a*. As a result, at a step 175 of FIG. 17, the data access may be fulfilled. This should be the ordinary course of operation.

In some circumstances, however, the ELVID and the physical address may not match at step 173. This may occur, for example, if the volume 126 is initially stored in primary storage element 125*a* and subsequently moved. If the configuration table 181 host 122*a* has not been updated as a result of that move, the host 122*a* may send (incorrectly) access requests to a stale data location.

If the ELVID and physical address do not match at step 173, the corresponding host table (181 in the example described with respect to FIG. 18) must be updated.

Step 174 may be performed in a variety of ways. For example, whenever a logical entity is moved from a primary storage element, updating information (e.g., a forwarding address) can be retained at the primary storage element. In this case, the primary storage element could simply forward the appropriate information to the host 122*a*, which could then update its configuration table 181. In an alternative embodiment, again in the context of FIG. 18, the primary storage element 125*a* could simply notify the host 122*a* that the ELVID verification process did check out. In this case, host 122*a* could then obtain the appropriate physical location for the ELVID from the enterprise storage management console 124, which includes that information in table 180.

Moving Logical Entities

Figure 19:
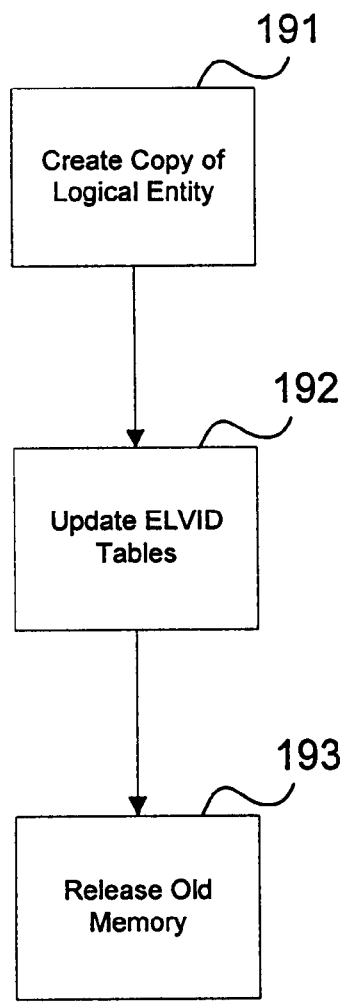
FIG. 19 illustrates one embodiment of a method for moving logical entities in a system that uses ELVIDs.

FIG. 19 illustrates one embodiment of a method for moving a logical entity in a system that employs ELVIDs. At a step 191, a copy of the logical entity is created. The copy may be created at the destination location for the logical entity.

At a step 192, the appropriate ELVID tables are updated. These tables were described generally above, and specify the appropriate physical location for the logical entity being moved.

At a step 193, the old memory is released.

The method of FIG. 19 is used most simply if all reading and writing of the logical entity can be frozen during the moving process. In this embodiment, when the copy of the logical entity is created in step 191, there is no fear of updates being made to the logical entity at the old location that would not be reflected where the copy is being created. Similarly, if accessing of the data is frozen (or at least writing of the date is frozen), there is no fear that updating of the ELVID will result in the loss of data. For example, if one host is writing to an old storage element because the applicable ELVID has not been updated while another host is reading from a different location, the incorrect version of the data may be used. Similarly, if only one host may access the logical entity and the ELVID update can be synchronized with the input/output stream, a logical entity can be moved according to FIG. 19, without having to freeze access to the logical entity.

Figure 20:
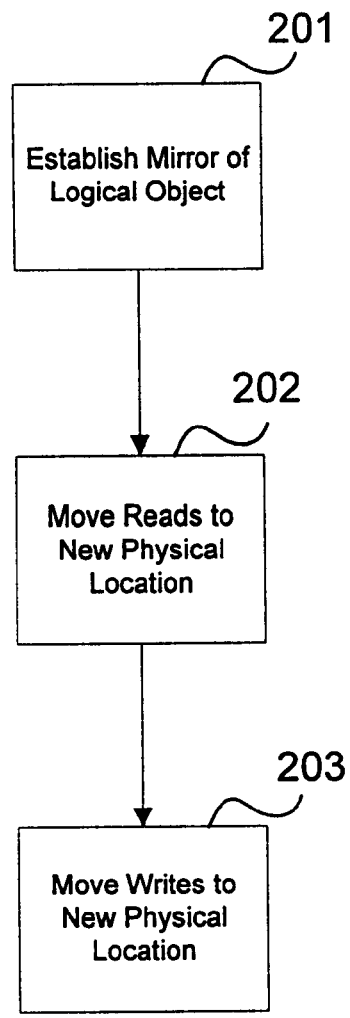
FIG. 20 illustrates one embodiment of moving an ELVID to a new physical location.

FIG. 20 illustrates one embodiment that permits movement of a logical entity or object in the storage domain while host applications may still be accessing the logical object.

At a step 201, a synchronous mirror of the logical object is established.

Figure 21A:
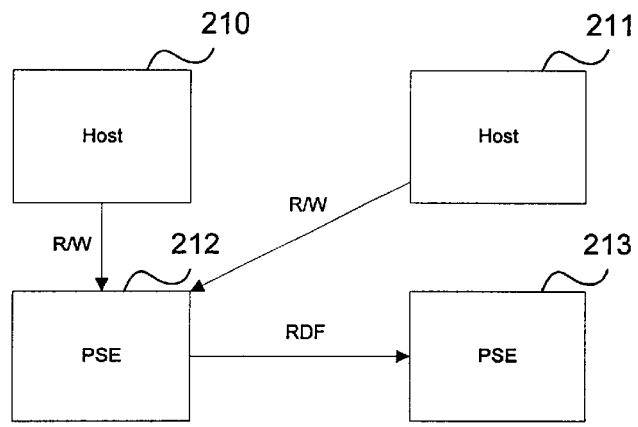
FIGS. 21A–21C illustrates application of the method of FIG. 20 in the context of one embodiment of a computer system.

FIG. 21A shows an example of a system with two host computers 210, 211 and storage elements 212, 213. All reads and writes are performed for a particular logical entity stored on a storage element 212. A mirror is established from the storage element 212 to the destination storage element 213. In the example of FIG. 21A, the storage element 212 establishes as mirror on storage element 213 using a remote data facility, as described above. Naturally, other mechanisms could be used to create a mirror.

Figure 21B:
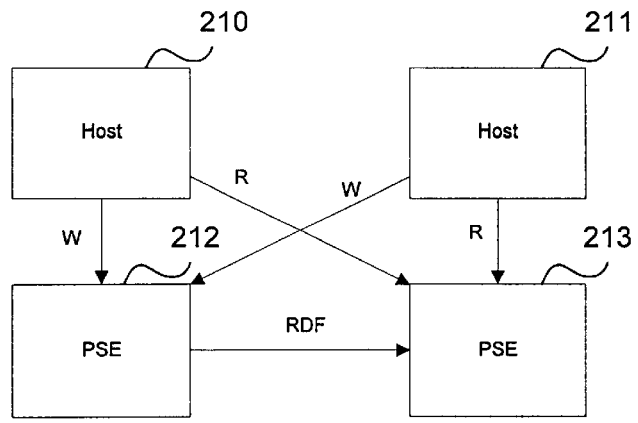
Figure 21C:
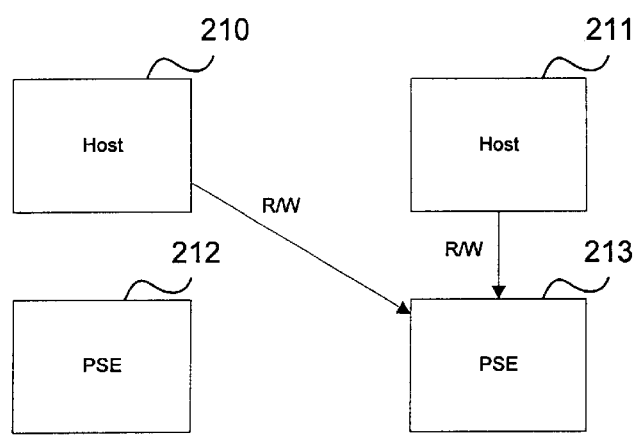

For the particular mirror used in the example embodiment of FIGS. 21A–21C, any writes that are performed on the primary copy (initially on storage element 212) are automatically and immediately mirrored on a mirror copy on storage element 215.

Returning to FIG. 20, at a step 202, all reads by the host computers are moved to the new, destination storage element.

Referring to FIG. 21B, the state of the system of FIG. 21A is shown, but after performing step 202. In particular, all reads to the applicable logical entity from host computers 210, 211 are performed on the new storage element 213. All writes, however, continue to be performed on the initial storage element 212. These writes are mirrored, however, on the new destination storage element 213.

By moving the reads before the writes, coherence of the data can be assured when more than one host is accessing a logical entity. All of the writes are maintained on what will become the old copy 212 until all reads by all hosts in the storage domain has been moved. Although reads are occurring on the new copy and writes are made on the old copy, each write is synchronously mirrored onto the new copy.

Returning to FIG. 20, at a step 203, all of the writes are moved to the new storage element. This is illustrated in FIG. 21C, where all reads and writes are being performed on primary storage element 213.

To move writes to the new location, in this embodiment, the storage element 212 with the old copy refuses to acknowledge any reads to that storage element (since reads have been moved, none should occur). The mechanisms which map writes are then updated map writes to the new location.

The mechanism used to move reads and writes can differ depending on the particular mechanism for using ELVIDs to access data. In an embodiment where ELVID checking is performed, a storage element 212 can simply respond to read requests with a notification that the address has moved, to accomplish moving of reads from the original copy of storage element 212 to the new copy of storage element of 213. The same could be done at a later point in time to move the writes. (The same mechanism can be used to move reads and writes simultaneously in systems where this is desired.)

Using ELVID mapping at the host computer as described above, ELVID checking could also be implemented at the storage elements to support movement of logical entities from one storage element to another as well as used as an additional check to assure that the appropriate entity is being accessed. In the alternative, the enterprise and storage network controller 124 of FIG. 14 (or some other entity in the host or storage domain) could track and update which host computers have been notified of the identity of a location of a ELVID and simply issue appropriate control messages to update the host configuration tables on those hosts. In these embodiments, the configuration table 141 may include tracking information as to which hosts in the host domain 120 have been notified of the location of a logical entity.

In some embodiments, one of the entities in the system can track and maintain a log of the operations performed during a move. Where an enterprise storage management console is provided, for example, the enterprise storage management console can track and log the movement process for archival purposes and, in the case of failure, to permit recovery of the logical entity.

A similar mechanism can be used to restore a backup copy of a logical entity, to rollback the system to an earlier state or to recover from loss of data.

Figure 22:
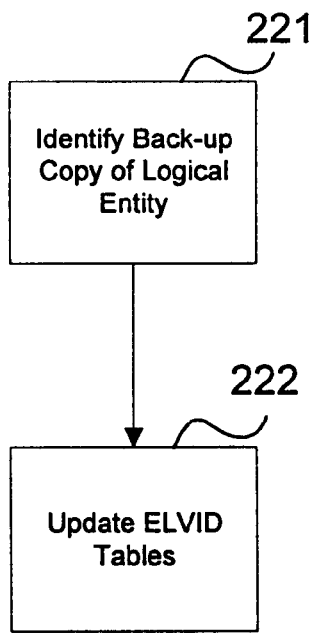
FIG. 22 illustrates one embodiment of a method for restoring a backup copy of a logical entity using ELVID.

FIG. 22, illustrates a block diagram of one method for performing this. At a step 221, the backup copy of the logical entity to be restored is identified.

At a step 222, the appropriate ELVID tables are updated. As described above, the particular mechanism for updating the ELVID tables will depend upon the manner in which ELVID tables are used. Two examples of the use of ELVIDs are described above—ELVID mapping and ELVID checking systems. Depending on the manner of the use of ELVIDs, the ELVID tables are updated appropriately also as described above.

Access Checking

In the embodiments described above, as well as other embodiments, ELVIDs may be used to restrict access to logical entities.

One level of restricting access to ELVIDs may be described with reference to FIG. 15A. In this embodiment, when a host first accesses a logical entity, the location for the logical entity is not known at step 151. Accordingly, when the host seeks to find the location of the logical entity at step 153, an access authorization or verification process may occur. For example, if the enterprise storage management console 124 of FIG. 14 is used to notify the host of the ELVID mapping, the enterprise storage management console can first verify that access is authorized.

In addition or in the alternative, access verification can occur at the storage element. Thus, when a storage element receives an access request with an ELVID at step 173 of FIG. 17, the storage element can verify that the access request from this particular host or user is authorized. (For example, by querying the enterprise management console the first time a host or user releases a logical entity and by maintaining a corresponding entry in a configuration table if access is authorized.) If not, the storage element can notify both the host and the enterprise storage management console that the access request has been denied.

Access checking can be used not only to verify that a user can access the logical entity but also can be used to permit some users to read, but not write, a logical entity.

To assist access checking in the embodiment of FIG. 18, the various ELVID mapping tables 180, 181 and 182 may include access information. This may include a column in the table that specifies, for example, unrestricted access or access only to specified hosts or users. The various schemes for determining access to logical entities would be apparent to one of ordinary skill in the art based on the disclosure provided herein. For example, the host that originally creates a logical entity may specify the access restrictions (if any) for a logical entity. Updates or modifications to the access list can be tracked.

Example System

Figure 23:
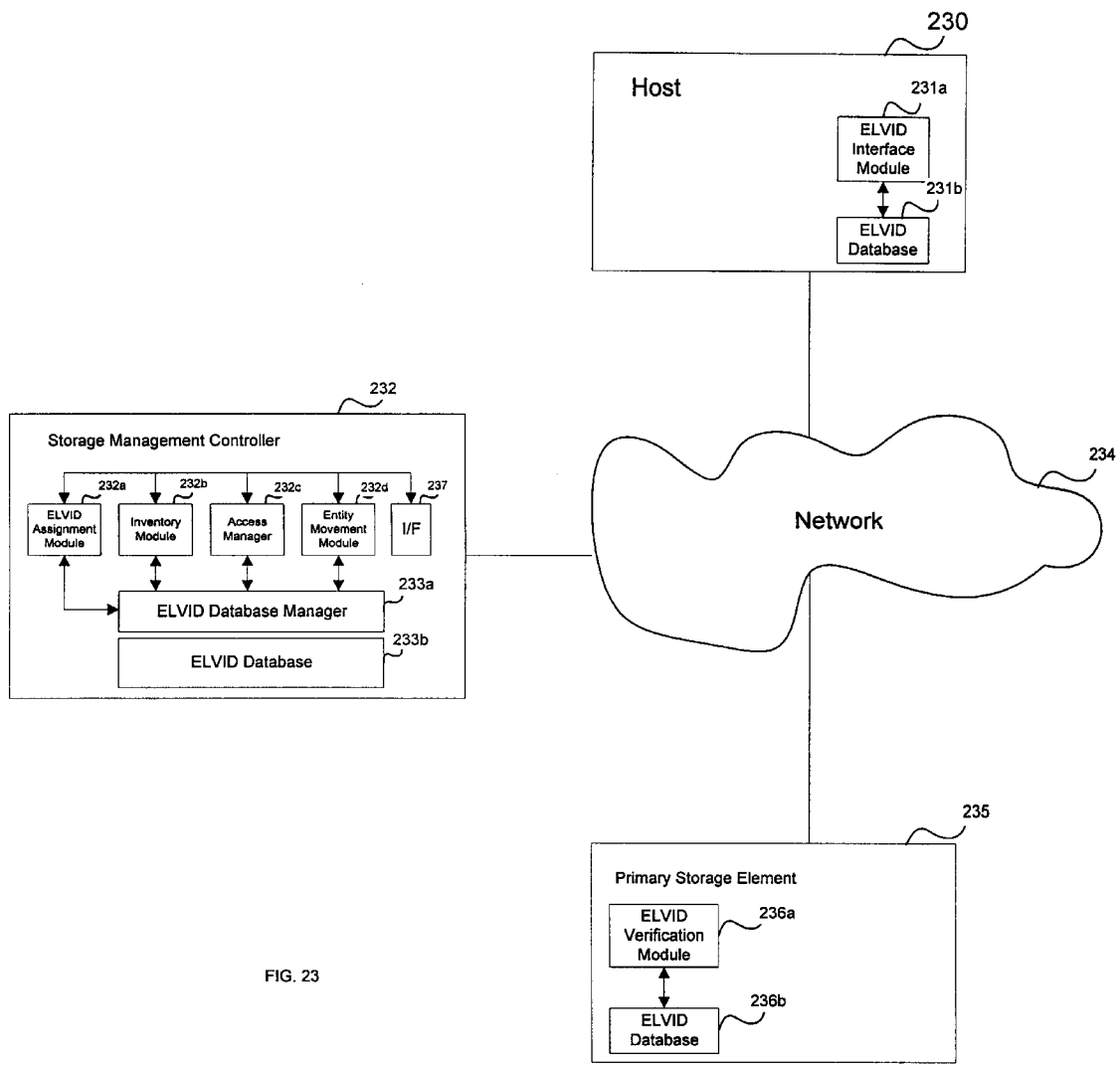
FIG. 23 illustrates one embodiment of a computer system that uses ELVIDs for performing various functions.

FIG. 23 illustrates one embodiment of a computer system that uses ELVIDs for a variety of functions. In this particular embodiment, many of the ELVID functions are performed by a storage management controller 232. This storage management controller may be a separate computer system, including its own processor and memory. The storage management controller 232 is connected to a network 234. The computer network 234 handles communications among the host computers (e.g., host computer 230) and storage elements (e.g., primary storage element 235).

The host computer 230 performs application processing and may support one or more users.

The primary storage element 235 is a storage element in the computer system. The primary storage element may be any computer storage medium, including the Symmetrix storage element described above.

Although the network 234 is illustrated as a single network, it may include one or more subnetworks. For example, the storage management controller 232 may communicate with one or more of the host computers (e.g., 230) or storage elements (e.g., 235) using a separate network, such as a TCP/IP network. The host computer 230 and primary storage element 235 may communicate over that network or may instead use a different network, such as a fibre channel.

In the example of FIG. 23, the storage management controller 232 includes a variety of software modules for implementing various functions related to ELVIDs. ("Module" as used herein refers generically to a mechanism to perform a function. Thus, a "module" may be implemented as a software module or may be implemented in firmware, hardware of a combination of these.) Of course, the storage management controller may include a number of other software or other modules that perform additional storage management functions, such as maintaining or coordinating primary verses secondary storage, as generally described above.

In the example of FIG. 23, the storage management controller 232 includes an ELVID assignment module 232*a*. The ELVID assignment module is responsible for assigning ELVIDs to logical entities, when requested by a host computer (e.g., host 230). As described generally above, the ELVID should be unique to the applicable logical entity.

The ELVID assignment module coordinates with an ELVID database manager 233*a*, which controls access to-an ELVID database 233*b*. The ELVID database may be a table or other database, as generally described above. Thus, in an example embodiment, the ELVID database may include information specifying an ELVID, its location among the storage elements, e.g., storage element 235 and description field or fields including information of the types described above.

In the example embodiment of FIG. 23, the storage management controller 232 also includes an inventory module 232*b*. The inventory module may perform inventorying functions, as described above. For example, the inventory module may periodically query the applicable host computer 230 to determine whether the logical entity is still required for use. In addition, the inventory module may periodically determine whether the logical entity may be moved from primary storage to secondary storage. This may be performed by, for example, polling the host computers that access a logical entity to determine whether the logical entity is still in use.

The storage management controller 232 of FIG. 23 also includes an access manager 232*c*. The access manager may receive access requests from the host computers, e.g., 230. The access manager would be responsible for sending physical location information to any host computer that requests access to the logical entity. The access manager 232*c* may also perform verification that any host or user on the host requesting access to a logical entity is permitted that access, all as described above.

The entity movement module 232d would be responsible for managing the movement of logical entities within or among storage elements in the system. The entity movement module may, for example, employ the methods described above for moving an entity between storage elements.

Finally, the storage management controller 232 includes an interface 237 to coordinate communication among the other components of the computer system.

In the example of FIG. 23, the host computer 230 includes an ELVID interface module 231*a* and an ELVID database 231*b*. the ELVID database may include a table as generally described above. The ELVID interface module 231 a may perform the functions described above for managing use of the ELVIDs. The ELVID interface module 231 a may interface with the operating system on the host computer 230, for example intercepting requests for access to storage and mapping or adding ELVID information to requests as appropriate.

The primary storage element 235, in the example of FIG. 23, includes an ELVID verification module 236*a* and an ELVID database 236*b*. Again, the ELVID database may include the information described above with respect to configuration tables for storage elements. The ELVID verification module 236*a* may perform a function of checking ELVIDs against physical locations to assure that any access request is receiving data for the correct logical entity.

For each of the host 230, storage management controller 232 and primary storage element 235, additional software and hardware components may be included to perform the other functions in the computer system. In addition, the example illustrated in FIG. 23 is illustrative—there are many ways that the functions described above may be implemented.

The various methods above may be implemented as software on a floppy disk, compact disk, or other storage device, for use in programming or controlling a computer. The computer may be a general purpose computer such as a work station, main frame or personal computer, that performs the steps of the disclosed processes or implements equivalents to the disclosed block diagrams and may include in addition, or instead, special purpose hardware for performing some or all of such steps or similar steps. The software may be included on a diskette as a complete system or as enhancements to an existing system, permitting the system to perform the methods described herein.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of moving a logical volume from a first storage system to a second storage system coupled to the first storage system by an enterprise storage network so that the first and second storage systems are capable of independently responding to requests from a host computer to access data stored on the first and second storage systems, the first and second storage systems being capable of storing the logical volume and making the logical volume accessible to the host computer over the enterprise storage network, the method comprising steps of:

providing an enterprise logical volume identifier (ELVID) for the logical volume;

providing a copy of the logical volume on the second storage system; and associating a physical storage location on the second storage system with the ELVID to cause accesses to the logical volume to be made to the physical storage location on the second storage system.

2. The method of claim 1, wherein the step of associating comprises a step of changing an entry in at least one ELVID database.

3. The method of claim 2, wherein the step of changing is performed by the host computer.

4. The method of claim 2, wherein the step of changing is performed by a storage management controller.

5. The method of claim 1, further comprising a step of maintaining at least one ELVID database at the host computer.

6. The method of claim 1, wherein the logical volume is a conventional logical volume.

7. The method of claim 1, wherein the logical volume is a hyper-volume.

8. The method of claim 1, wherein the logical volume is a striped volume.

9. The method of claim 1, wherein the logical volume is a partition.

10. The method of claim 1, wherein the step of associating comprises steps of:

moving all reads for the logical volume to the physical storage location on the second storage system; and after the step of moving all reads, moving all writes for the logical volume to the physical storage location on the second storage system.

11. A method of rolling back a logical volume to a previous state, the method comprising steps of:

providing a copy of the logical volume in the previous state, the logical volume being associated with at least one of a plurality of storage systems in an enterprise that further comprises an enterprise storage network that couples together the plurality of systems so that each of the plurality of systems is capable of independently responding to a request from a host computer to access data stored thereon, the plurality of storage systems being capable of storing the logical volume and making the logical volume accessible to the host computer over the enterprise storage network;

providing an enterprise logical volume identifier (ELVID) for the logical volume, the ELVID being uniquely defined among the plurality of storage systems; and associating a physical storage location for the copy with the ELVID to cause accesses to the logical volume to be made to the physical storage location for the copy.

12. The method of claim 11, wherein the logical volume is a conventional logical volume.

13. The method of claim 11, wherein the logical volume is a component of a conventional logical volume.

14. The method of claim 11, wherein the logical volume is a hyper-volume.

15. The method of claim 11, wherein the logical volume is a striped volume.

16. The method of claim 11, wherein the logical volume is a partition.

17. A method of providing for and implementing immediate restoration of a logical volume, the method comprising steps of:

maintaining a restoration copy of the logical volume at a physical storage location on a storage device on at least one of a plurality of storage systems in an enterprise that further comprises an enterprise storage network that couples together the plurality of storage systems so that each of the plurality of storage systems is capable of independently responding to a request from a host computer to access data stored thereon, the plurality of storage systems being capable of storing the logical volume and making the logical volume accessible to the at least one host computer over the enterprise storage network;

providing an enterprise logical volume identifier (ELVID) for the logical volume, the ELVID being uniquely defined among the plurality of storage systems; and changing a physical storage location associated with the ELVID for the logical volume to correspond to the physical location on the storage device for the restoration copy, to restore the logical volume.

18. The method of claim 17, wherein the logical volume is a conventional logical volume.

19. The method of claim 17, wherein the logical volume is a component of a conventional logical volume.

20. The method of claim 17, wherein the logical volume is a hyper-volume.

21. The method of claim 17, wherein the logical volume is a striped volume.

22. The method of claim 17, wherein the logical volume is a partition.

23. The method of claim 17, wherein the step of maintaining comprises a step of mirroring the logical volume, on the storage device.

24. The method of claim 17, further comprising a step of using a storage management controller to implement the changing step.

25. The method of claim 24, wherein the step of step of changing comprises a step of updating an entry in at least one ELVID database.

26. The method of claim 25, wherein the at least one ELVID database is stored on a host computer that accesses the logical volume.

27. The storage management controller of claim 17, wherein the logical volume management module includes a module to update entries on at least one ELVID database of each of at least one host computer that may access the logical volume.

28. The storage management controller of claim 27, further comprising an ELVID database that includes information identifying each host computer that may access corresponding logical volumes with corresponding ELVIDs.

29. A storage management controller for at least one of a plurality of storage systems in an enterprise that further comprises an enterprise storage network that couples together the plurality of storage systems so that each of the plurality of storage systems is capable of independently responding a request from a host computer to access data stored thereon, the at least one of the plurality of storage systems having a plurality of storage elements, the plurality of storage systems being capable of storing at least one logical volume and making the at least one logical volume accessible to the at least one host computer over the enterprise storage network, the storage management controller comprising:

an interface module to communicate with the storage elements; and a logical volume management module to move the location of logical volume access requests by updating entries in at least one enterprise logical volume identifier (ELVID) database comprising a plurality of ELVIDs, wherein each of the plurality of ELVIDs is uniquely defined among volumes on the plurality of storage systems.

30. The storage management controller of claim 27, further comprising an ELVID database.

31. An enterprise computer system, comprising:

at least one host computer;

a plurality of storage systems;

an enterprise storage network that couples together the plurality of storage systems and the at least one host computer so that each of the plurality of storage systems is capable of independently responding to a request from the at least one host computer to access data stored thereon, the plurality of storage systems being capable of storing at least one logical volume and making the at least one logical volume accessible to the at least one host computer over the enterprise storage network; and means for changing the location of access requests for the at least one logical volume stored on one of the storage systems, including means for changing a physical storage location address associated with an enterprise logical volume identifier (ELVID) for the at least one logical volume, the ELVID being uniquely defined among volumes on the plurality of storage systems.

32. The computer system of claim 31, wherein the means for changing the location comprises a storage management controller.

33. The computer system of claim 31, wherein the means for changing the location comprises an ELVID database at each host computer.

34. The computer system of claim 31, further comprising means for maintaining a restoration copy of the logical volume.

* * * * *